United States Patent [19]
Uffenheimer

[11] Patent Number: 6,110,427
[45] Date of Patent: Aug. 29, 2000

[54] FLOW REGULATOR TO MAINTAIN CONTROLLABLE VOLUMETRIC FLOW RATE

[75] Inventor: Kenneth F. Uffenheimer, Los Gatos, Calif.

[73] Assignee: Becton, Dickinson and Company, Franklin Lakes, N.J.

[21] Appl. No.: 09/133,845

[22] Filed: Aug. 14, 1998

[51] Int. Cl.[7] .................................................. G05D 7/01
[52] U.S. Cl. .............................. 422/81; 422/73; 422/100; 422/103; 436/73; 436/52; 436/180; 137/501; 137/504
[58] Field of Search ..................................... 137/501, 504, 137/505.25; 422/81, 67, 73, 100, 103; 436/43, 52, 55, 174, 180

[56] References Cited

U.S. PATENT DOCUMENTS

| | | |
|---|---|---|
| 1,887,322 | 11/1932 | Nettleton . |
| 2,154,223 | 4/1939 | Wade ........................................ 138/26 |
| 2,696,831 | 12/1954 | Malick ..................................... 137/505 |
| 2,742,764 | 4/1956 | St. Clair ....................................... 62/1 |
| 3,392,752 | 7/1968 | Iozzi et al. ............................... 137/501 |
| 3,520,312 | 7/1970 | Ackerman et al. .......................... 137/4 |
| 3,593,738 | 7/1971 | Baerfuss ................................... 137/209 |
| 3,749,113 | 7/1973 | Isreeli et al. ............................. 137/209 |
| 3,774,628 | 11/1973 | Norton et al. ........................... 137/501 |
| 4,147,177 | 4/1979 | Iwatsuki ................................... 137/504 |
| 4,347,395 | 8/1982 | Chu et al. ................................ 585/420 |
| 4,819,688 | 4/1989 | Field .................................... 137/493.6 |
| 5,251,655 | 10/1993 | Low ........................................ 137/501 |
| 5,395,588 | 3/1995 | North, Jr. et al. ......................... 422/81 |
| 5,460,199 | 10/1995 | Takata et al. .............................. 37/504 |
| 5,464,581 | 11/1995 | van den Engh ...................... 422/81.02 |
| 5,483,469 | 1/1996 | van den Engh .......................... 364/555 |
| 5,602,039 | 2/1997 | van den Engh .......................... 436/164 |
| 5,643,796 | 7/1997 | van den Engh ............................ 436/50 |
| 5,913,328 | 6/1999 | Taube et al. .............................. 137/315 |
| 5,996,615 | 12/1999 | Zuegner et al. .......................... 137/493 |

OTHER PUBLICATIONS

FACScan™ Brochure, Becton Dickinson and Company, 1994.
FACS Vantage™ Brochure, Becton Dickinson and Company, 1995.
FACS Calibur™ Brochure, Becton Dickinson and Company, 1995.
PK87639 Brochure, Micro Switch—A Honeywell Division, 2 pages.
FACSort™ Brochure, Becton Dickinson and Company, 1994.
FACSCount™ Brochure, Becton Dickinson and Company, 1994.

*Primary Examiner*—Long V. Le
*Attorney, Agent, or Firm*—Alan W. Fiedler

[57] ABSTRACT

A flow regulator is provided which comprises a housing defining a chamber therein and including inlet and outlet ports that are adaptable to allow fluid to flow into and out of the chamber. A piston assembly, including an orifice defining member in which is formed an orifice, is movably disposed in the chamber and is capable of moving in directions toward and away from the outlet port. An urging device, such as a spring, magnetic or electromagnetic device, urges the piston assembly away from the outlet port. As fluid flows into the flow regulator, the fluid flows through the orifice. The clearance between a control surface of the piston assembly and the outlet port automatically adjusts so that an equilibrium condition occurs in the flow regulator in which the difference between the pressure of the fluid upstream of the orifice and the pressure of the fluid downstream of the orifice is maintained essentially constant. This results in the fluid flowing through the orifice, and in turn through the clearance between the control surface of the piston and the outlet port, and subsequently out of the flow regulator, at a flow rate which is relatively unaffected by a change in supply pressure, downstream pressure, and the temperature of the fluid which affects the viscosity of the fluid.

14 Claims, 28 Drawing Sheets

FLOW REGULATOR TO MAINTAIN CONTROLLABLE VOLUMETRIC FLOW RATE

BACKGROUND OF THE INVENTION

The present invention relates to a flow regulator apparatus, and a system employing the same, which regulates the flow of fluid through the system to maintain the flow of fluid at a controllable volumetric flow rate. More particularly, the present invention relates to a flow regulator that is employed in, for example, a sheath fluid delivery system of a flow cytometer, to regulate the flow of sheath fluid so that the fluid flows at a constant volumetric flow rate which is unaffected by the pressure, temperature, and viscosity of the fluid.

Many different types of devices for regulating the flow of fluid through a fluid delivery system are known in the art. For example, as described in U.S. Pat. No. 1,887,322, a valve is employed in a train brake pipe that is supplied with fluid under pressure to regulate the pressure of the fluid in the brake pipe. U.S. Pat. No. 2,742,764, on the other hand, describes a system for supplying liquid anhydrous ammonia to soil as a fertilizer, in which is employed a device for regulating the flow of the liquefied anhydrous ammonia through the system. Flow regulators are also employed in exhaust systems in automobiles, as described in U.S. Pat. No. 3,520,312, and are further employed in gas mixing systems as described in U.S. Pat. No. 3,392,752.

Certain types of medical devices include fluid delivery or distribution systems which employ devices that regulate the flow of fluid to the system. For example, in an infusion pump or IV pump, or in a dialysis system, it is necessary to regulate the flow of blood or fluid to the patient. In the art of flow cytometry, it is necessary to regulate the flow of sheath fluid through the sheath fluid delivery system of the flow cytometer.

A flow cytometer is an apparatus for analyzing, and optionally sorting, biological cells or any other particles of interest in a moving fluid stream. Known flow cytometers are described, for example, in U.S. Pat. Nos. 4,347,395, 5,395,588, 5,464,581, 5,483,469, 5,602,039 and 5,643,796, the entire contents of which are incorporated by reference herein. Other known flow cytometers are the FACS Vantage™, FACSort™, FACSCalibur™, FACSCount™ and FACScan™ systems, all of which are manufactured by Becton Dickinson and Company, the assignee of the present invention.

Flow cytometers such as those described above typically include a sample reservoir for receiving a biological sample, such as a blood sample, which contains cells that are to be analyzed. The cells are transported in a cell stream to an area of the flow cytometer known as a flow cell. A sheath fluid is also directed to the flow cell.

Within the flow cell, the sheath fluid forms a liquid sheath around the cell stream, and the combined sheath fluid and cell stream are focused through a cell analysis region. At the cell analysis region, the cells intercept a laser beam, which causes the laser light to scatter. Furthermore, the laser light excites reagents that have been added to the biological sample, and causes those reagents to fluoresce. An optical detection system, such as a set of photomultiplier tubes, photodiodes or other devices for measuring light, are focused onto the point at which the cells intersect the laser beam (i.e., the interrogation region) to detect the laser light scattered by the cell, fluorescent light emitted from the reagent adhering to the cell, and a portion of the laser beam which passes through the cell. The flow cytometer interprets the light detected by these optical detecting devices to ascertain chemical and physical characteristics of the cell, such as size, granulation of the cytoplasm, and the presence of specific antigens. The flow cytometer can thus count the number of cells in the sample having any of these specific properties.

After passing through the interrogation region, the cell stream is directed through an orifice in the flow cell which forms droplets of sheath fluid, with each droplet containing a respective cell. That is, after each cell passes the interrogation region, it passes through the orifice and becomes suspended in a droplet of sheath fluid. At the moment the droplet is being formed, it is charged with a potential having a magnitude representative of characteristics of the cell being suspended in that droplet. The flow cytometer then sorts these charged droplets, and hence the cells suspended therein, electrostatically or by any other suitable method.

Maintaining a stable sheath fluid flow rate in a flow cytometer is critical for several reasons. For example, some flow cytometers use multiple lasers which emit beams through different locations in the interrogation region in the flow cell. The sheath flow, which governs the movement of the cells through the flow cell, must be stable to insure that the cells intersect the beams at predictable times, so that the scattered light, pass-through light and fluorescent light for each laser beam can be detected at the appropriate time for each cell. In flow cytometers which perform cell sorting, it is necessary to maintain a stable sheath flow rate to insure that the droplet formation for each cell which is to be sorted occurs at a given time after the cell has passed the interrogation region, so that the droplets can be charged based on the detected characteristics of the cell suspended therein.

A known apparatus for directing sheath fluid at a constant flow rate through a sheath fluid delivery system employs a syringe pump. The syringe pump is loaded with a required amount of sheath fluid, and the piston of the syringe pump is advanced at a steady and controlled rate to introduce the sheath fluid into the sheath fluid delivery system at a steady and controlled rate.

Although this apparatus is generally effective in delivering the sheath fluid at a controlled flow rate, the amount of sheath fluid that can be delivered to the system is limited by the size of the syringe pump. Therefore, it is necessary to refill the syringe pump quite often, which is undesirable for tests which require lengthy analysis periods. Furthermore, reliable syringe pumps of these types are expensive and require periodic maintenance. Dual chamber piston pumps, such as the type commonly used in chromatography instrumentation, can overcome the problem of limited fluid volume by delivering the sheath fluid at a constant flow rate through the coordinated action of both pumps. However, dual chamber pumps are more complex and thus, are more costly and require further maintenance than typical single chamber syringe pumps.

Other known systems regulate the sheath fluid flow rate through the use of a vacuum pump, for example, as described in U.S. Pat. No. 5,395,588 to North, Jr., et al., the entire contents of which is incorporated herein by reference. The vacuum pump creates a vacuum downstream of the flow cell to cause the sheath fluid to flow through the fluid delivery system at a steady flow rate. Although this method is effective in providing an essentially uninterrupted flow of sheath fluid, the flow rate of the sheath fluid can change due to a change in temperature of the sheath fluid, as well as due to changes in the liquid level in the source container, and partial clogging of the sheath supply filter. That is, a change in temperature of the sheath fluid will change the viscosity of the sheath fluid, and thus effect the sheath fluid flow rate. Also, since vacuum pumps do not create an unvarying pressure due to mechanical tolerances and so on, such fluctuations in pressure can greatly affect the flow rate of the sheath fluid.

Another known method for regulating flow of fluid includes the use of a flow regulator as described in U.S. Pat. No. 3,749,113. The flow regulator described in this patent includes two flexible diaphragms which create three pressure chambers in the device. The diaphragms are coupled to each other by a member which is coupled to the housing of the device by a spring. Variations in pressure in the pressure chambers cause the diaphragms to move in opposition to the force exerted on the member by the spring until the pressures in the chambers equalize. This pressure equalization maintains a virtually constant flow rate of the fluid flowing through the system.

However, the flexible diagrams employed in this type of regulator are costly, subject to tearing, and make the regulator difficult and costly to manufacture. Furthermore, in order for this type of regulator to operate properly, it must be immersed in a temperature controlled bath. The temperature controlled bath is necessary to maintain constant the temperature of the fluid, and thus maintain constant the viscosity of the fluid passing through the regulator. Additionally, this type of regulator requires the application of pressurized air to the fluid storage chamber, and to one of the chambers in the flow regulator, which further complicates the system.

Accordingly, a continuing need exists for a less complicated flow regulator which is capable of maintaining a constant volumetric flow rate of a fluid through a fluid delivery system, and which is unaffected by changes in fluid temperature, fluid pressure and fluid viscosity.

SUMMARY OF THE INVENTION

An object of the present invention is to provide a flow regulator for maintaining a constant volumetric flow rate of a fluid flowing through a fluid delivery system, such that the flow rate is unaffected by changes in supply pressure, downstream pressure and fluid temperature which affects fluid viscosity.

A further object of the invention is to provide a flow regulator which maintains a constant volumetric flow rate of a fluid through a fluid delivery system without the use of a flexible diaphragm in the regulator.

A further object of the invention is to provide a flow regulator which maintains a constant volumetric flow rate of a fluid in a fluid delivery system, and which includes additional ports that are adaptable to be connected to valves which enable the flow regulator to maintain different constant volumetric flow rates of the fluid.

Another object of the invention is to provide a sheath fluid delivery system in a flow cytometer which employs a flow regulator that maintains a constant volumetric flow rate of the sheath fluid which is unaffected by changes in temperature and viscosity, and by changes in supply and downstream pressures.

A still further object of the invention is to provide a sheath fluid delivery system which employs a plurality of flow regulators in a corresponding plurality of sheath fluid delivery paths, to maintain different constant volumetric flow rates of the sheath fluid through those different paths in a manner unaffected by changes in temperature and viscosity, and by changes in supply and downstream pressures.

These and other objects of the invention are substantially achieved by providing a flow regulator comprising a housing which defines a chamber therein and comprises inlet and outlet ports that are in communication with the chamber and are adaptable to direct fluid into and out of the chamber. The flow regulator further includes a piston that is slidably disposed in the chamber. The piston includes a cavity therein and is movable in directions toward and away from the outlet port. A control seat is slidably received in the cavity of the piston and is urged by an urging device in a direction toward the bottom of the piston. Alternatively, the control seat can be integral with the piston, or connected to the piston in any suitable manner.

The urging device can comprise a spring, or an electromagnetic device which imposes an electromagnetic force on the control seat and, if desirable, on the piston. Also, the piston, the control seat, or both, can be weighted and the flow regulator housing can be oriented so that the force of gravity urges the piston and control seat away from the outlet port. The urging device also can comprise a combination of magnets on the control seat, piston, or both, and internal and/or external to the flow regulator. Furthermore, the piston, control seat, or both can be made of or include a metal on which a magnet internal or external of the flow regulator imposes a magnetic force which urges the control seat and piston away from the outlet port.

The control seat includes a surface that is adaptable to approach the outlet port and the chamber when the pressure of the fluid entering the chamber is sufficient to overcome the urging force imposed on the control seat by the urging device, and thus moves the control seat in a direction toward the outlet port. The clearance between the opening in the outlet port and the surface of the control seat limits the flow of fluid from the chamber through the outlet port. The housing can further include additional ports which provide communication between the chamber and, for example, orifice and valve arrangements which can adjust the flow rate at which the fluid is to be constantly maintained by the flow regulator.

The flow regulator can be employed, in particular, in a sheath fluid delivery system of a flow cytometer to maintain a constant volumetric flow rate of the sheath fluid in a manner unaffected or essentially unaffected by changes in upstream and downstream pressure and changes in temperature, and independent of viscosity of the sheath fluid. A plurality of the flow regulators can be included in different branches of the sheath fluid delivery system to maintain different constant volumetric flow rates of the sheath fluid through those branches. The flow regulator can also be employed in hematology systems, IV pumps, dialysis systems, or any other systems which require a constant volumetric fluid flow rate.

BRIEF DESCRIPTION OF THE DRAWINGS

The various objects, advantages and novel features of the present invention will be more readily appreciated from the following detailed description when read in conjunction with the accompanying drawings, in which.

DETAILED DESCRIPTION OF THE PREFERRED EMBODIMENTS

Figure 1:
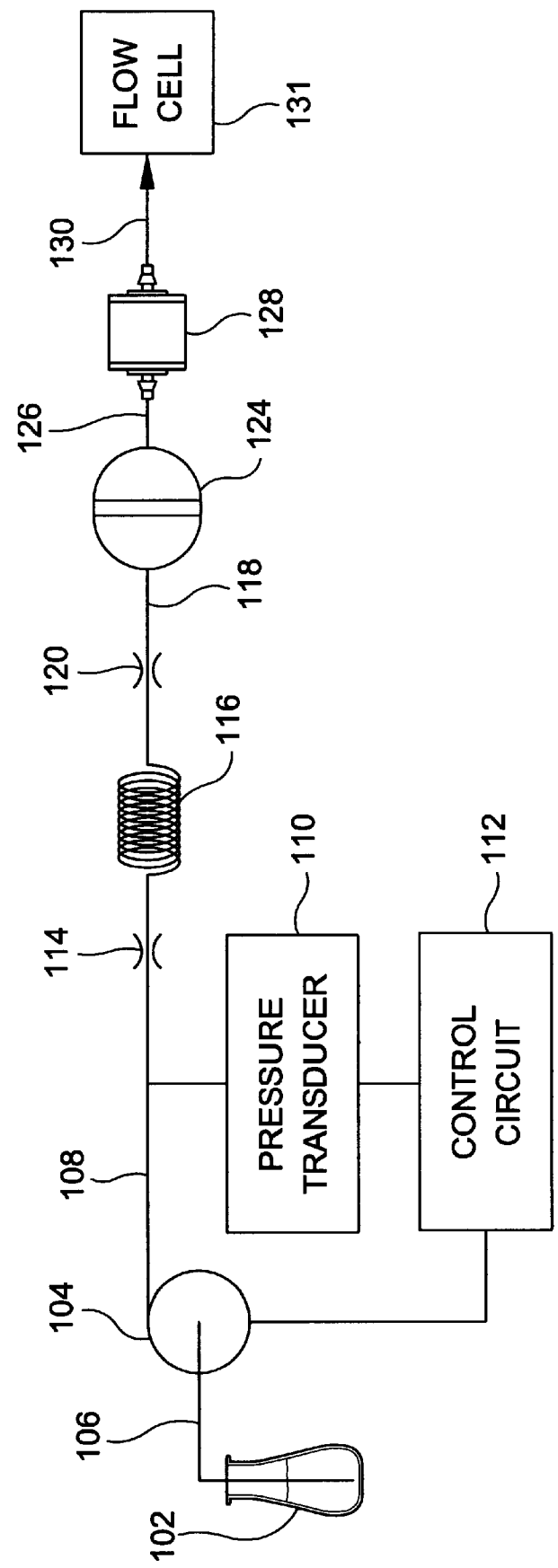
FIG. 1 is a schematic illustration of an example of a sheath fluid delivery system according to an embodiment of the present invention which is employed in a flow cytometer.

FIG. 1 is a schematic illustration of a sheath fluid delivery system 100 according to an embodiment of the present invention, which can be employed in a flow cytometer of the type described above. The sheath fluid delivery system 100 includes a sheath fluid storage container 102, a pump 104, conduit section 106 which communicates between the interior of the sheath fluid storage container 102 and the pump 104, and a conduit section 108 coupled to the output port of pump 104.

The sheath fluid delivery system further includes a pressure transducer 110 which monitors the pressure in the conduit section 108, and a control circuit 112 which controls the pump 104. An orifice 114 is provided in the conduit section 108, which is further coupled to an accumulator 116. The output of the accumulator 116 is coupled to conduit section 118 in which is also provided an orifice member 120.

The conduit section 118 is coupled to a filter 124 which filters particles from the sheath fluid, and outputs the filtered sheath fluid to conduit section 126. The conduit section 126 is coupled to the input port of a flow regulator 128, whose output port is coupled to conduit section 130. The conduit section 130 directs the sheath fluid to, for example, a flow cell 131 in the flow cytometer.

The operation of the sheath fluid delivery system will now be described.

The sheath fluid storage container 102 contains sheath fluid that is to be delivered by the sheath fluid delivery system 100 to, for example, the flow cell (not shown) of the flow cytometer. The pump 104, which is a KNF Neuberger Model NF-10 diaphragm pump, or any other suitable type of pump, generates a negative pressure in conduit section 106 which draws the sheath fluid through the conduit section 106 and into the pump 104. The pump 104 then pumps the sheath fluid into conduit section 108. The conduit sections 106 and 108 are each, for example, vinyl (e.g., polyvinyl chloride or PVC) tubing having a 0.125 inch inner diameter.

The pump 104 can be any suitable type of pump, such as diaphragm pump, peristaltic pump, piston pump, gear pump, and the like. Alternatively, the sheath fluid storage container 102 can be a closed container into which pressure and air is introduced by pump 104 (e.g., by an air conduit not shown)

to cause the liquid to be forced from the container 102 and into conduit section 106. Also, the sheath fluid can be gravity fed through the sheath fluid delivery system.

The pressure transducer 110 can be a Honeywell model PK 8763 9 pressure transducer, a Sensym pressure transducer, or any other suitable pressure transducer, which senses the pressure of the sheath fluid in conduit section 108. The control circuit 112 receives signals from the pressure transducer 110 representative of the pressure of the sheath fluid in conduit section 108, and controls the operation of the pump 104 accordingly.

Figure 2:
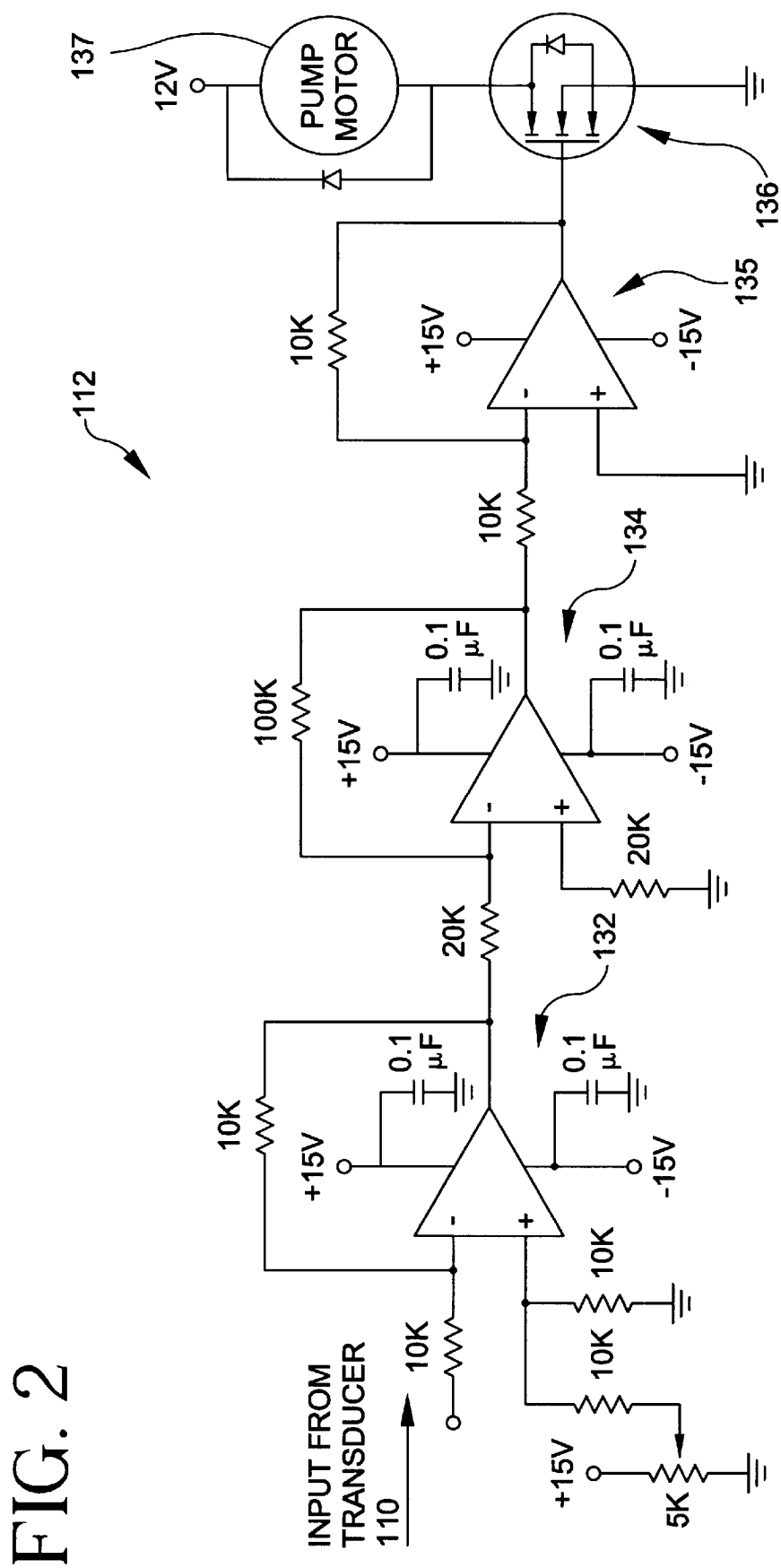
FIG. 2 is a schematic illustration of an electrical circuit that can be employed in the systems shown in FIG. 1, and in FIGS. 3 and 4 below, to provide a control signal which regulates a pump in the system based on the pressure of the fluid delivered by the pump as detected by a pressure sensor.

An example of the control circuit 112 is shown in FIG. 2. As indicated, a signal output from pressure transducer 110 is fed into an operational amplifier circuit 132 which compares the level of that signal to a level representative of a desired fluid pressure. If the level of the signal provided by the pressure transducer 110 is below the threshold level, thus indicating that the pressure is below the desired pressure, the operational amplifier circuit 132 will output a signal representative of this condition. This signal is amplified by operational amplifier circuit 134, inverted by operational amplifier circuit 135, and provided to control a switch 136 to drive the pump motor 137 of the diaphragm pump 104 to cause the diaphragm pump 104 to pump. The pumping by the diaphragm pump 104 generally is sufficient to increase the pressure of the sheath fluid in conduit section 108 above the desired threshold level. When the operational amplifier circuit 132 determines that the signal provided by the flow pressure sensor is above the desired threshold level, the operational amplifier circuit 132 outputs a signal indicative of this condition, which is amplified by operational amplifier circuit 134, inverted by operational amplifier circuit 135 and provided to switch 136 to stop the pump motor 137 from driving the diaphragm pump 104.

Returning to FIG. 1, orifice member 114 is provided in the conduit section 108 downstream of the pressure transducer 110. This orifice member 114 has a 0.010 inch diameter opening therein through which the sheath fluid in the conduit section 108 can pass. Hence, the orifice member 114 creates a pressure difference in the sheath fluid between the portion of the conduit section 108 upstream of the orifice member and the portion of the conduit section 108 downstream of the orifice member 114, which dampens high frequency pulses in the flow rate of the sheath fluid and thus, provides a less pulsatile pressurized flow of sheath fluid.

The downstream portion of the conduit section 108 is coupled to accumulator 116 which can be, for example, a 50 inch long section of silicone tubing having a 0.125 inch inner diameter, and which is coiled in a helical fashion. The accumulator 116 acts as an energy storage device which stores a build up of pressure of the sheath fluid, and thus helps to minimize high frequency pulses in the flow of sheath fluid through the system.

As described above, the output of the accumulator 116 is coupled to conduit section 118, which is, for example, vinyl tubing having a 0.125 inch inner diameter. The conduit section 118 includes an orifice member 120 which, like orifice member 114, has a 0.010 inch diameter opening therein. Thus, the orifice member 120 creates a pressure differential between the fluid in the portion of the conduit section 118 upstream of the orifice member 120 and the fluid in the portion of the conduit section 118 downstream of the orifice member 120, which further dampens high frequency pulses in the pressure of the sheath fluid supplied to the flow regulator 128 discussed below by pumps which create pulsatile flow by nature, such as diaphragm pumps, piston pumps and the like. Damping of these high frequency pulses improves the ability of the fluid delivery system to deliver the fluid at a less pulsatile, relatively steady flow rate.

A pressure transducer (not shown) can be inserted in the system to monitor the pressure of the fluid in the downstream section of the conduit section 118, for example, when the sheath fluid delivery system 100 is being tested. The downstream portion of the conduit section 118 provides the sheath fluid to filter 124, such as a filter that is present in the FACScan flow cytometer manufactured by Becton Dickinson and mentioned above. Filter 124 filters particles from the sheath fluid to prevent clogging and to prevent extraneous particles from entering the flow cell 131.

The filter 124 provides the filtered sheath fluid to conduit section 126, which is coupled to the input of flow regulator 128. Conduit section 126 can be, for example, vinyl tubing having a 0.125 inch inner diameter. As described in more detail below, flow regulator 128 outputs the sheath fluid into conduit section 130 and maintains the volumetric flow rate of the sheath fluid constant regardless of the pressure, temperature or viscosity of the sheath fluid within and around normal ranges of these conditions that would occur during normal operation of a flow cytometer.

Figure 3:
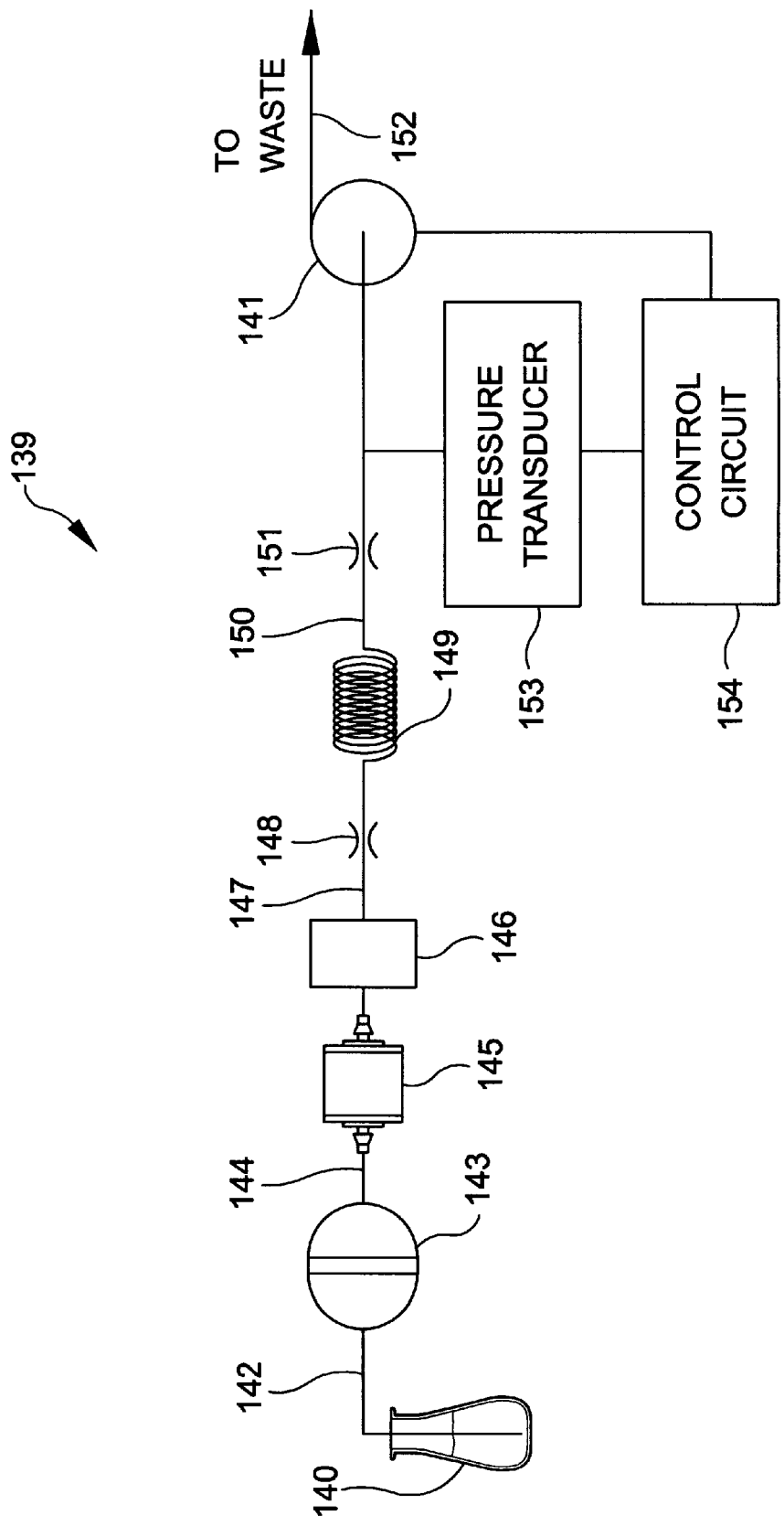
FIG. 3 is a schematic illustration of an example of a sheath fluid delivery system according to another embodiment of the present invention which is employed in a flow cytometer.

Alternatively, the sheath fluid delivery system can be a vacuum-type fluid delivery system 139 as shown, for example, in FIG. 3. This type of sheath fluid delivery system 139 includes a sheath fluid storage container 140 which is similar to sheath fluid storage container 102 described above. However, the sheath fluid delivery system 139 includes a vacuum pump 141 which creates a negative pressure in the sheath fluid delivery system 139 to draw sheath fluid into the system.

That is, conduit section 142 communicates with the interior of sheath fluid storage container 140 and filter 143, which is similar to filter 124 described above. The sheath fluid is drawn through conduit section 142, filtered by filter 143, and provided via conduit section 144 to a flow regulator 145 which is similar to flow regulator 128 described above and maintains a constant or essentially constant flow of fluid through the sheath fluid delivery system 139.

The sheath fluid output from flow regulator 145 at a constant or essentially constant flow rate is drawn through a flow cell 146 of the flow cytometer. After passing through the flow cell 146, the sheath fluid flows through conduit section 147 having an orifice 148 similar to orifice 114 described above. The sheath fluid flowing through orifice 148 flows through accumulator 149, and through conduit section 150 having an orifice 151 therein. The accumulator 149 and orifice 151 are similar to accumulator 116 and orifice 120, respectively, described above.

The fluid is drawn through pump 141 and flows through conduit section 152 to, for example, a waste container or other downstream components (not shown). The pressure of the fluid in conduit section 150 is monitored by pressure transducer 153 which is similar to pressure transducer 110 described above. Pressure transducer 153 provide a signal to control circuit 154 which controls the pumping of the pump 141 based on the detected pressure of the fluid in conduit section 150 in a manner similar to control circuit 112 described above. Hence, a flow of sheath fluid which is unaffected or essentially unaffected by changes in pressure, temperature and viscosity of the sheath fluid occurs in sheath fluid delivery system 139.

As discussed above, another example of a sheath fluid delivery system is disclosed in U.S. Pat. No. 5,395,588 to North, Jr. et al. A flow regulator such as flow regulator 145

(or flow regulator 128) described above can be employed in a sheath fluid delivery conduit of the sheath fluid delivery system described in U.S. Pat. No. 5,395,588 to provide a constant or essentially constant flow of sheath fluid to the flow cell of the flow cytometer described therein. Also, the control circuit 154 shown in FIG. 3 can be configured similar to the control circuit shown in FIG. 5 of U.S. Pat. No. 5,395,588, if desired, to control the pumping of pump 141 based on the detected pressure in conduit section 150 of the sheath fluid delivery system 139.

Figure 4:
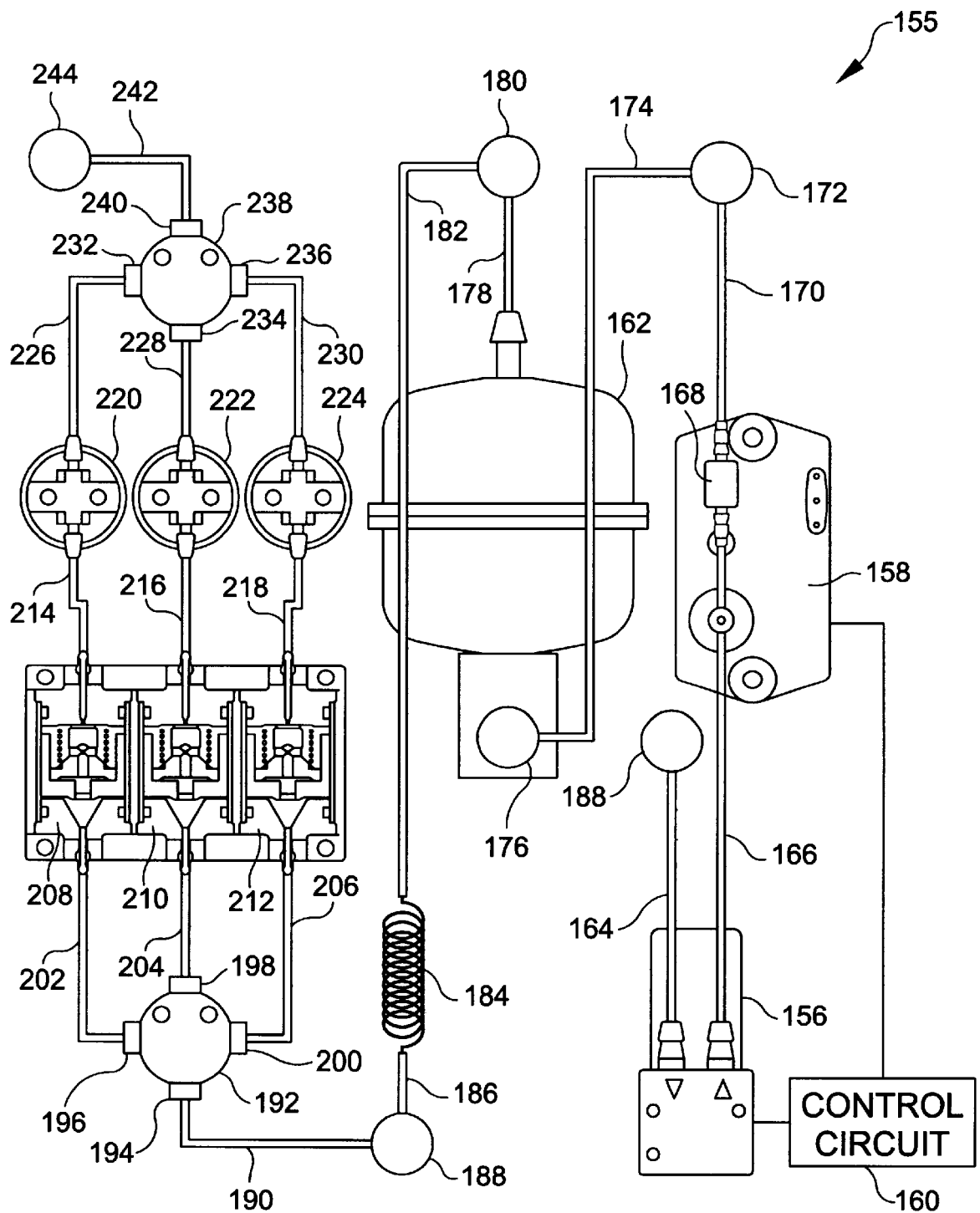
FIG. 4 is a schematic illustration of an example of a sheath fluid delivery system according to another embodiment of the present invention which is employed in a flow cytometer and includes modifications to the embodiment shown in FIG. 1.

Another embodiment of a sheath fluid delivery system is shown in FIG. 4. The sheath fluid delivery system 155 is similar to sheath fluid delivery system 100 in that it includes a pump 156, a pressure transducer 158, a control circuit 160 and a filter 162. These components operate in a manner similar to the pump 104, pressure transducer 110, control circuit 112 and filter 124 described above with regard to the sheath fluid delivery system 100 as shown in FIG. 1. That is, the pump 156 draws sheath fluid from a sheath fluid storage container (not shown) through conduit section 164 and pumps the sheath fluid through conduit section 166. The sheath fluid delivery system 155 is shown as it would be mounted to, for example, a panel within a flow cytometer. In this example, the conduit section 164 is in communication with a sheath fluid storage container (not shown), which is located on the opposite side of the panel, via a fitting 168 which passes through the panel.

The pressure transducer 158 is similar to pressure transducer 110 described above in that it senses the pressure of the sheath fluid in conduit section 166 and provides an output signal representative of this detected pressure. The output signal is received by a control circuit 160, which is similar to control circuit 112 or control circuit 148 as shown in FIGS. 2 and 3, respectively. The control circuit 160 controls the pump 156 to pump if the detected pressure of the sheath fluid is insufficient, and to refrain from pumping if the pressure of the sheath fluid is sufficient. Conduit sections 164 and 166 can be, for example, vinyl tubing (e.g., polyvinylchloride or PVC) having a 0.125 inch inner diameter.

The sheath fluid delivery system 155 also includes an orifice member 168 which, like orifice members 114 and 120, includes a 0.010 inch diameter opening therein. The orifice member 168 therefore creates a difference in pressure between the sheath fluid in conduit section 166 and the sheath fluid passing through the opening in the orifice member 168 into conduit section 170. Conduit section 170 can be vinyl tubing having a 0.125 inch inner diameter. The conduit section 170 is coupled via a fitting 172 to another conduit section 174, which can be vinyl tubing having a 0.125 inch inner diameter.

The conduit section 174 is coupled to the input of filter 162 by a fitting 176. The filter 162 is similar to filter 124 described above, and filters particles from the sheath fluid.

The output of the filter 162 is coupled to a conduit section 178, which is further coupled via fitting 180 to conduit section 182. Conduit sections 178 and 182 can be vinyl tubing having a 0.125 inch inner diameter. The conduit section 182 is coupled to an accumulator 184 which stores pressure of the sheath fluid therein in a manner similar to accumulator 116 described above. The accumulator 184 can be made, for example, of a 50-inch long piece of silicone tubing having a 0.125 inch inner diameter. The accumulator 184 outputs the sheath fluid stored therein to a conduit section 186 which is coupled via a fitting 188 to a conduit section 190. Conduit sections 186 and 190 can be made of vinyl (e.g., PVC) tubing having a ⅛ inch inner diameter. Also, unlike conduit sections 164, 166, 170, 174 and 182, conduit sections 186 and 190 each have a 1/16 inch inner diameter.

Conduit section 190 is coupled to a cross fitting 192, which includes an input port 194 and three output orifice ports 196, 198 and 200. The output orifice ports 196, 198 and 200 are in communication with conduit sections 202, 204 and 206, respectively. Conduit sections 202, and 204 and 206 each are made of vinyl tubing having a 1/16 inch inner diameter. The output orifice ports 196, 198 and 200, in combination with accumulator 184, dampen out high frequency pulses in the sheath fluid flow. That is, the output orifice ports 196, 198 and 200 improve the ability of the sheath fluid delivery system to supply their respective conduit sections 202, 204 and 206 with a relatively steady, less pulsatile supply of pressurized sheath fluid.

Figure 5:
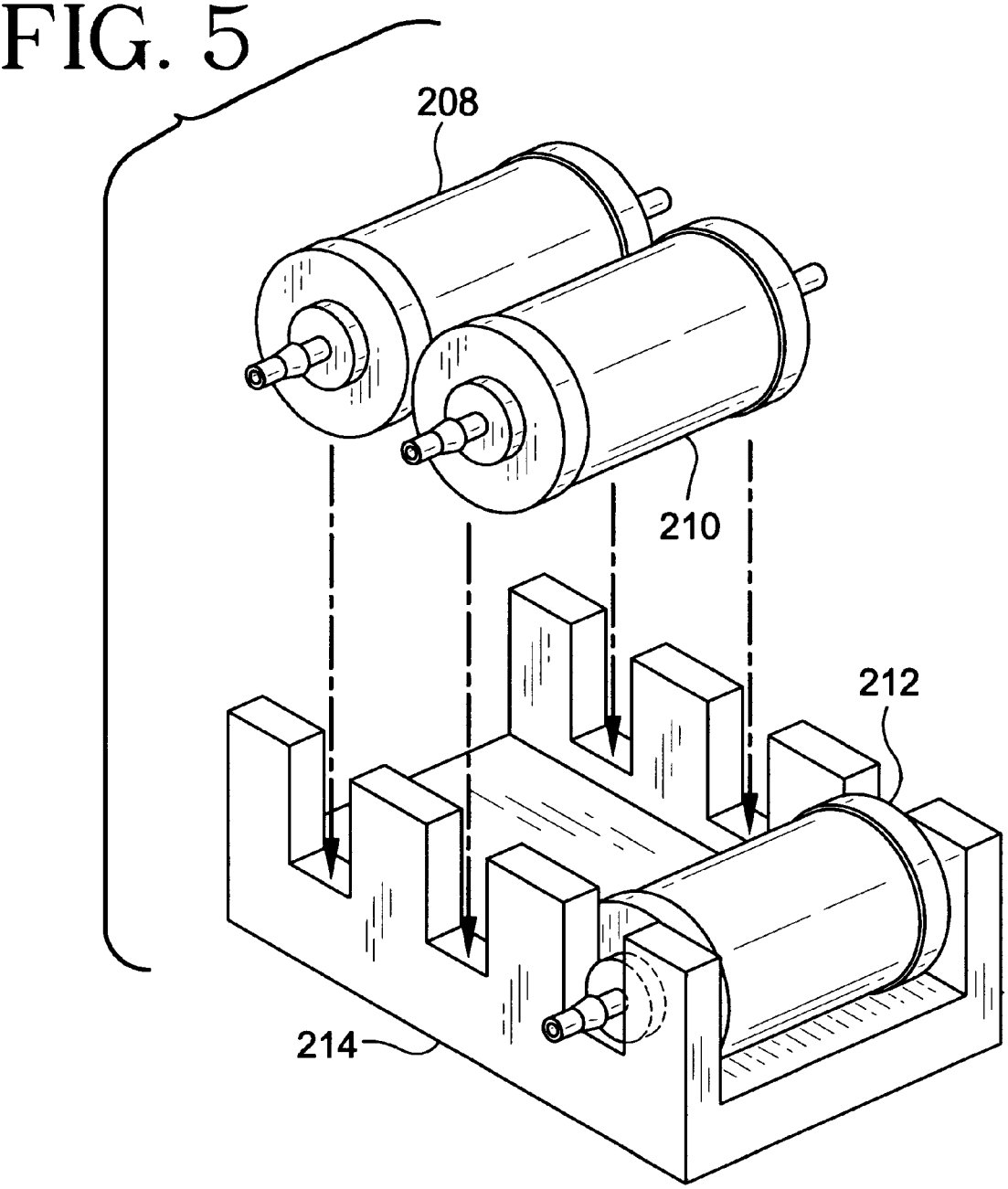
FIG. 5 is a schematic illustration of an example of a housing employed in the system shown in FIG. 4, which accommodates three flow regulators according to the present invention.

Conduit sections 202, 204 and 206 are coupled to the input ports of flow regulators 208, 210 and 212, respectively. The flow regulators 208, 210 and 212 are each similar to flow regulator 128 described above and, as described in more detail below, regulate the volumetric flow rate of the sheath fluid passing therethrough in a manner unaffected or essentially unaffected by changes in the pressure, temperature and viscosity of the sheath fluid. As shown in FIG. 5, the flow regulators 208, 210 and 212 can be mounted in a housing 214 which, for example, secures the flow regulators 208, 210 and 212 to the panel of the flow cytometer, and also assists in holding the input and output fittings (described below) of the flow regulators onto the glass cylinder (described below) of the flow regulators.

As further shown in FIG. 4, the output ports of flow regulators 208, 210 and 212 are coupled to conduit sections 214, 216 and 218, respectively, which are each made of vinyl tubing having a 1/16 inch inner diameter. The conduit sections 214, 216 and 218 are coupled to the input ports of valves 220, 222 and 224, respectively. The output ports of valves 220, 222 and 224 are coupled to conduit sections 226, 228 and 230, respectively, which are each vinyl tubing having a 1/16 inner diameter.

The conduit sections 226, 228 and 230 are coupled to the input ports 232, 234 and 236, respectively, of a cross fitting 238. The cross fitting 238 combines the sheath fluid being input from conduit sections 226, 228 and 230, and provides the combined volume of sheath fluid through an output port 240 to conduit section 242, which is a vinyl tubing having a 1/16 inch inner diameter. None of the input ports 232, 234 and 236, nor the output port 240, of the cross fitting 238 includes an orifice. Hence, the sheath fluid freely flows through input ports 232, 234 and 236, and out through output port 240. Conduit section 242 is coupled via a fitting 244 to the flow cell (not shown) of the flow cytometer.

The three flow regulator and three valve arrangement of the sheath fluid delivery system 155 is capable of providing the sheath fluid to the flow cell at different constant flow rates. The output orifice ports 196, 198 and 200 of cross fitting 192 should each have a size most suitably compatible with the flow rate that their respective one of the flow regulators 208,210 and 212 is set to maintain. For example, as discussed in more detail below, flow regulator 208 can be configured to allow the sheath fluid to flow through conduit section 202, flow regulator 208, conduit section 214, valve 220, and conduit section 226 at a stable or relatively stable flow rate of 4.5 ml/min. On the other hand, flow regulator 210 can be configured to allow the sheath fluid to flow through conduit section 204, flow regulator 210, conduit section 216, valve 222, and conduit section 228 at a stable or relatively stable flow rate of 9 ml/min. Likewise, flow regulator 212 can be configured to allow the sheath fluid to flow through conduit section 206, flow regulator 212, conduit section 218, valve 224, and conduit section 230 at a stable or relatively stable flow rate of 9 ml/min. Hence, the output orifice ports 196, 198 and 200 should be sized so that the output orifice ports 196, 198 and 200 do not create too much of a pressure drop between conduit section 190 and their respective conduit sections 202, 204 and 206. A very large pressure drop across any of the output orifice ports 196, 198 and 200 could result in pump 156 needing to pump the fluid at a very high pressure so that a fluid pressure appears in conduit sections 202, 204 and 206 which is sufficient to enable flow regulators 208, 210 and 212, respectively, to maintain their intended flow rates of the sheath fluid.

In sheath fluid delivery system 155, valves 220, 222 and 224 can be opened or closed in different combinations to provide different flow rates of the sheath fluid through conduit section 242 which provides the sheath fluid to the flow cell of the flow cytometer. That is, if valves 222 and 224 are closed, but valve 220 remains open, the sheath fluid will flow into conduit section 242 at a flow rate of 4.5 ml/min, which is governed and maintained constant or essentially constant by flow regulator 208. If valves 220 and 222 are closed, but valve 224 is open, the sheath fluid will flow into conduit section 242 at a rate of 9 ml/min, which is governed and maintained constant or essentially constant by flow regulator 212. If valve 220 is closed, but valves 222 and 224 are open, the sheath fluid will flow into conduit section 242 at a flow rate of 18 ml/min, which is the cumulative flow rate of the sheath fluid flowing through conduit sections 228 (9 ml/min) as governed and maintained constant or essentially constant by flow regulator 210, and through conduit section 230 (9 ml/min), as governed by the size of output orifice port 200 and maintained constant by flow regulator 212. Hence, the valves 220, 222 and 224 can be opened or closed in any combination to provide the sheath fluid to the flow cell of the flow cytometer at a flow rate equal to the sum of the flow rates of the sheath fluid passing through the individual valves 220, 222 and 224.

The details of a flow regulator according to an embodiment of the present invention will now be described with regard to FIGS. 6–16.

Figure 6:
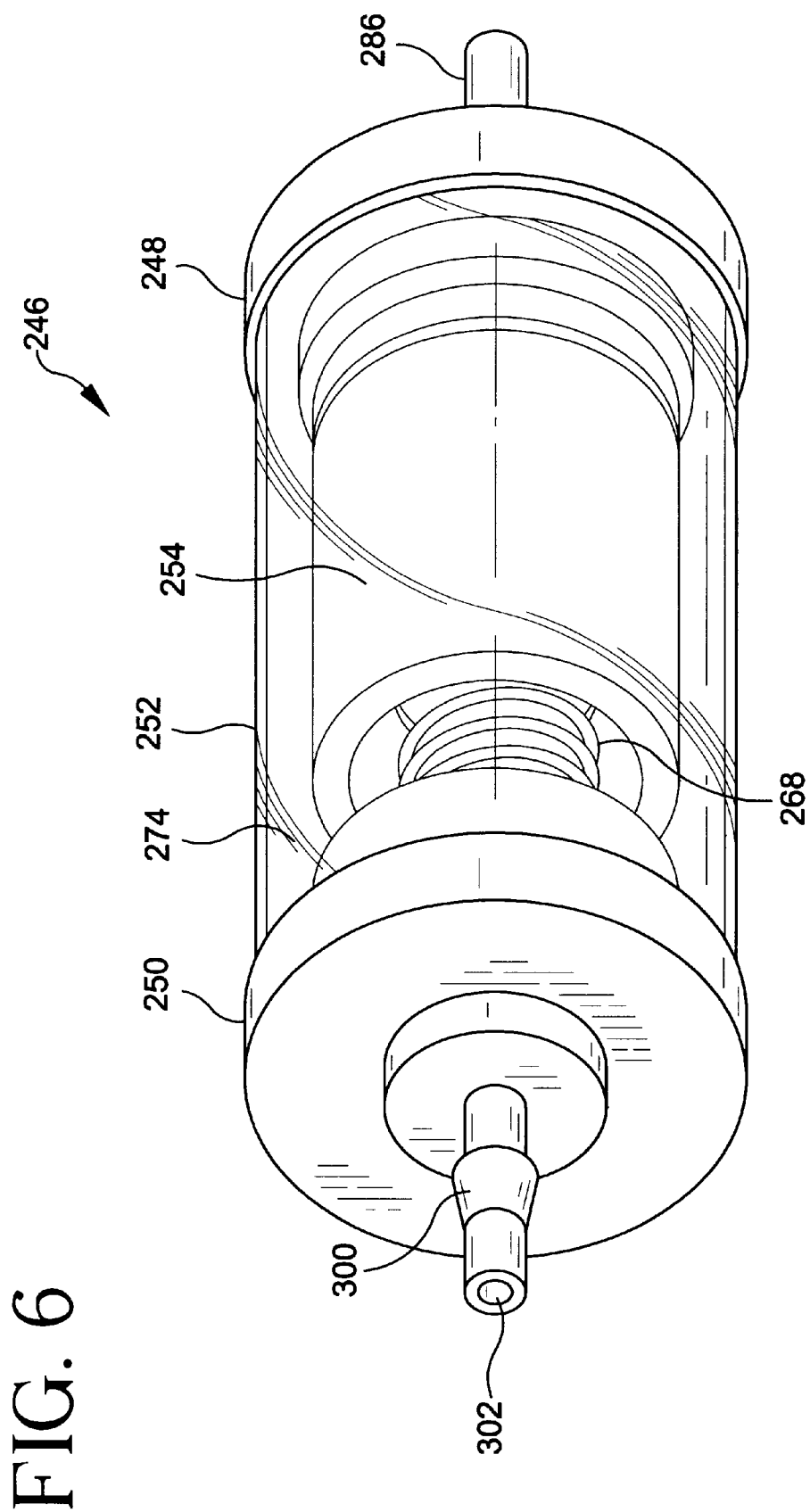
FIG. 6 is a perspective view of a flow regulator according to an embodiment of the present invention.
Figure 7:
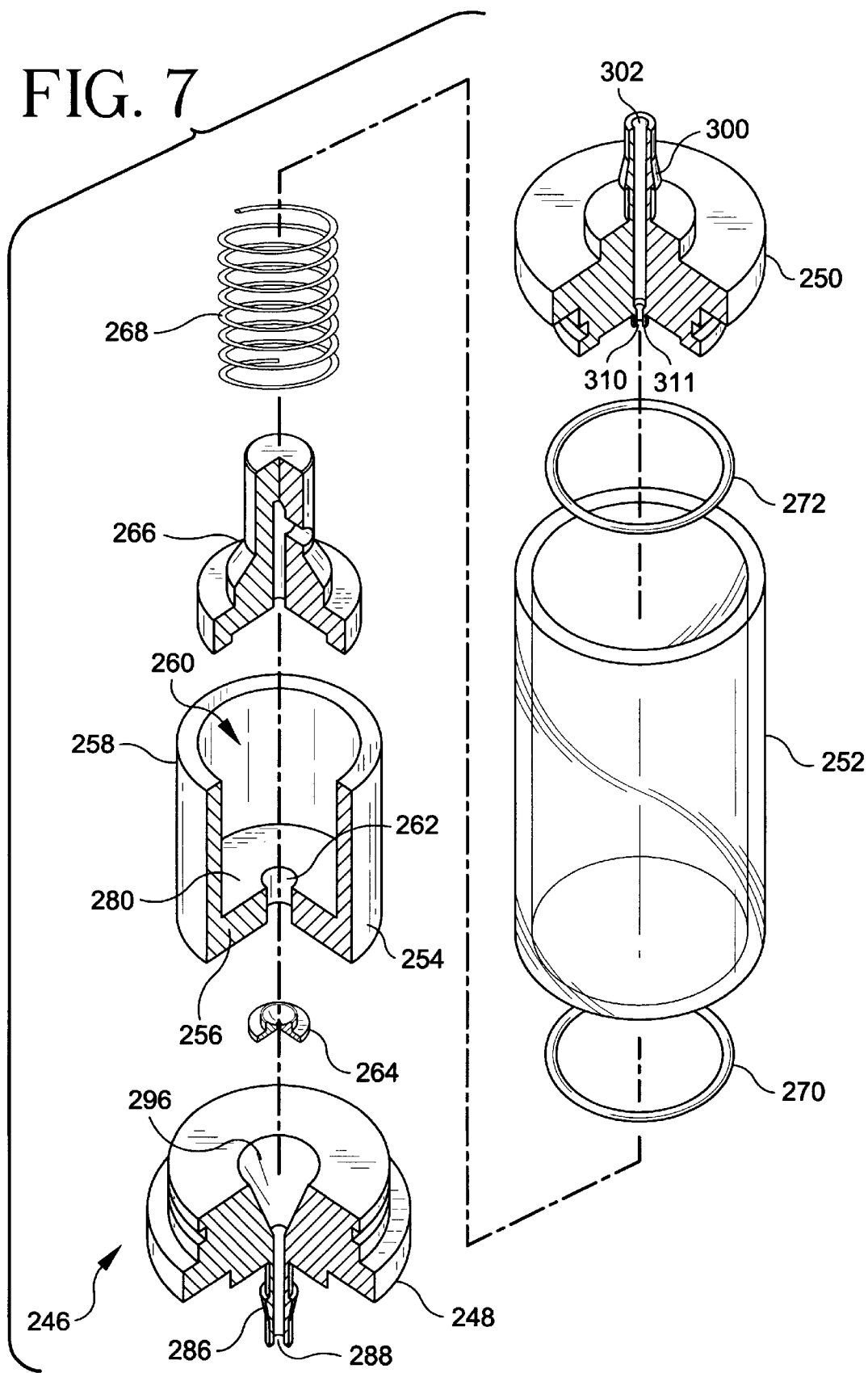
FIG. 7 is an exploded perspective view of the flow regulator shown in FIG. 6.
Figure 8:
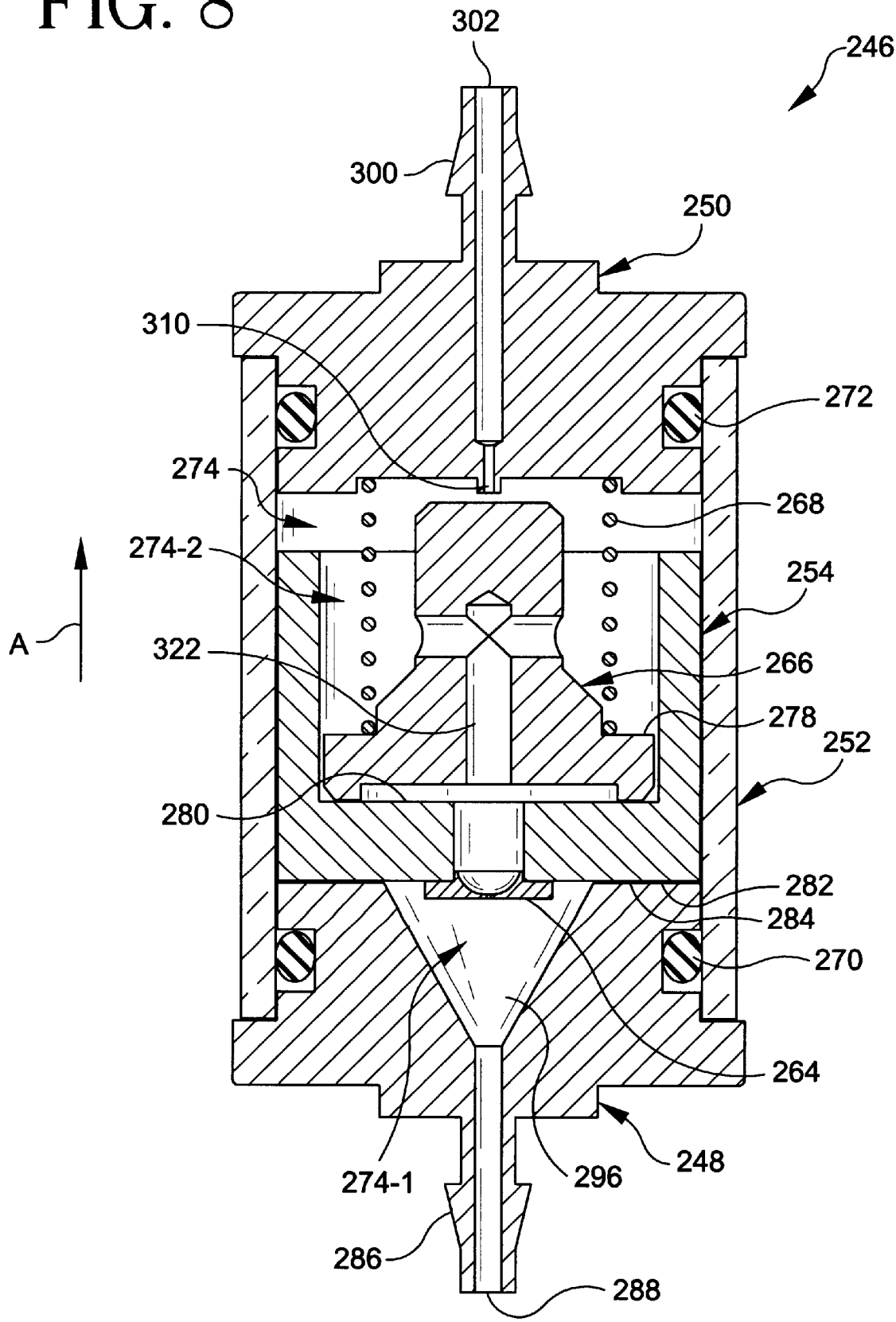
FIG. 8 is a cross-sectional view of the flow regulator as shown in FIG. 6.
Figure 9:
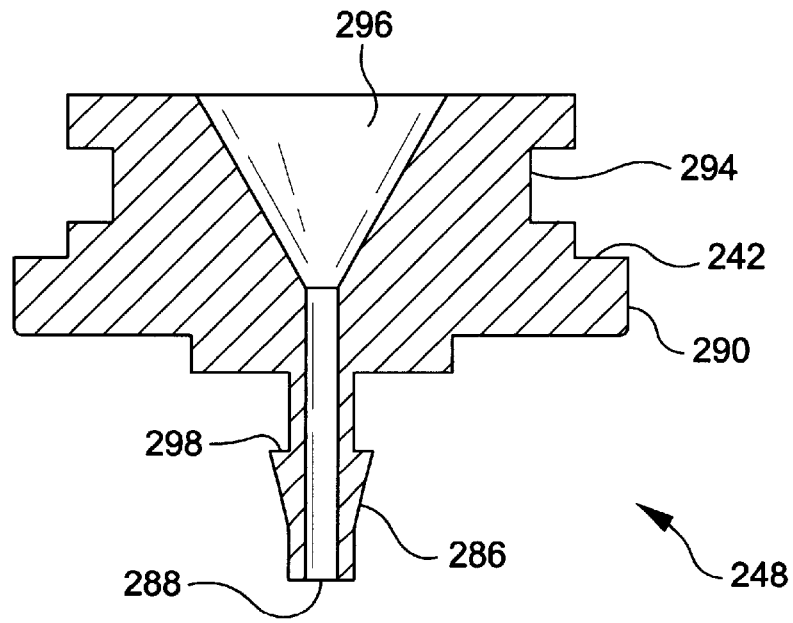
FIG. 9 is a detailed cross-sectional view of the input fitting of the flow regulator shown in FIG. 6.
Figure 10:
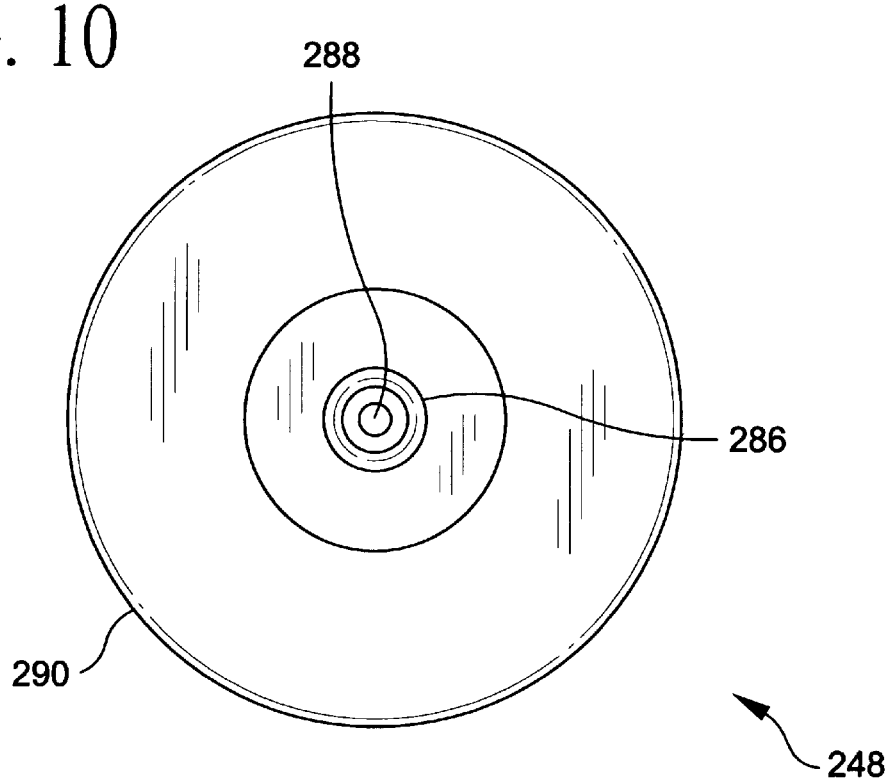
FIG. 10 is a detailed top view of the input fitting of the flow regulator shown in FIG. 6.

FIG. 6 is an assembled perspective view of a flow regulator 246 according to an embodiment of the present invention, FIG. 7 is an exploded perspective view of flow regulator 246, and FIG. 8 is a cross-sectional view of flow regulator 246 taken along lines 8—8 in FIG. 6. Flow regulator 246 can be used as the flow regulator 128 in the sheath fluid delivery system 100 shown in FIG. 1, and also as the flow regulators 208, 210 and 212 in the sheath fluid delivery system 155 shown in FIG. 4.

The body of the flow regulator 246 includes an inlet fitting 248, an outlet fitting 250 and a glass cylinder 252. The inlet and outlet fittings 248 and 250 can be made of any suitable material, such as stainless steel, titanium, polymeric material, plastic, composite material, carbon-graphite, ceramic, glass, or the like. The flow regulator 246 further includes a piston 254 that is slidably disposed in the glass cylinder 252. The glass cylinder 252 and piston 254 combination can be of the type manufactured by Airpot Corporation, of Norwalk, Conn. The cylinder 252 and piston 254 also can be made of any suitable material such as stainless steel, titanium, polymeric material, plastic, composite material, carbon-graphite, ceramic, glass, or the like.

The piston 254 is cylindrically or substantially cylindrically shaped and includes a bottom portion 256 and a cylindrical wall portion 258 which form a cavity 260 in the piston 254. The outer diameter of the piston 254 can be, for example, 0.624 inches. However, the piston 254 can have any suitable diameter compatible with the inner diameter of cylinder 252 to allow only a slight clearance (e.g., about 0.0004 inches, or slightly more or less) between outer diameter of piston 254 and inner diameter of cylinder 252 to minimize any leakage of fluid past the piston. An opening 262 is formed in the bottom portion 256 of the piston 254 as indicated.

The flow regulator 246 further includes an orifice member 264 which is coupled to the piston 254 over the opening 262 in the bottom portion 256. The function of the orifice member 264 is described in more detail below.

The flow regulator 246 further includes a control seat 266 which is made of any suitable material such as stainless steel, aluminum, or the like, and is slidably receivable into the cavity 260 of the piston 254. As described in more detail below, a spring 268 urges the control seat 266 toward the bottom portion 256 of the piston 254.

The flow regulator 246 further includes gaskets such as O-rings 270 and 272 which are made of any suitable elastomeric material such as Viton, Nitrile or the like. As shown specifically in FIG. 8, when the flow regulator 246 is assembled such that the inlet fitting 248 and outlet fitting 250 are inserted into opposite ends of the glass cylinder 252, the O-rings 270 and 272 provide a leak-tight seal which prevents or substantially prevents fluid from passing between the inner surface of the glass cylinder 252 and the outer surfaces of the inlet and outlet fittings 248 and 250. The inlet and outlet fittings 248 and 250 may be further secured to the ends of the glass cylinder 252 by any suitable adhesive or by casing 214 (see FIG. 5).

When the inlet and outlet fittings 248 and 250 are secured to the ends of the glass cylinder 252, a chamber 274 is formed inside the glass cylinder 252. The piston 254, orifice member 264, control seat 266 and spring 268 are housed in the chamber 274 as shown. As described in more detail below, the orifice member 264 divides the chamber 274 into an upstream portion 274-1 which is upstream of the orifice member 264 and a downstream portion 274-2 which is downstream of the orifice member 264. One end of the spring 268 contacts a recessed surface 276 of the outlet fitting 250, while the other end of the spring 268 contacts a stepped surface 278 of the control seat 266. Accordingly, the spring 268 urges the control seat 266 toward the inner surface 280 of the bottom portion 256 of the piston 254. The force applied by spring 268 to the control seat 266 is therefore applied via the control seat 266 to the piston 254, which urges the piston 254 toward the inlet fitting 248. Accordingly, when no fluid is flowing through the flow regulator 246, the outer surface 282 of the bottom portion 256 of the piston 254 contacts the upper surface 284 of the inlet fitting 248.

As illustrated, the inlet fitting 248 includes an inlet port 286 having an inlet opening 288 therein. The inlet fitting 248 is shown in more detail in FIGS. 9 and 10.

The inlet fitting 248 has a large diameter portion 290 which is cylindrical or substantially cylindrical. In this example, the large diameter portion is about 0.624 inches in diameter. The large diameter portion 290 includes a ledge portion 292 against which abuts one end of the glass cylinder 252. The inlet fitting 248 further includes a recessed portion 294 which has a reduced diameter and is sized to accommodate O-ring 270 when the inlet fitting 248 is coupled to the glass cylinder 252 as shown in FIG. 8.

The inlet opening 288 extends through the inlet fitting 248 such that the center of the inlet opening 288 is aligned with or substantially aligned with the longitudinal axis of the inlet fitting 248. The inlet opening 288 in this example has a diameter of about 0.040 inches, and communicates with a conical shaped bore 296 in the inlet fitting 248. The diameter of the conical shaped bore 296 and the angle of the side of the bore 296 with respect to the longitudinal axis of the inlet fitting 248 can be made at any suitable size to sufficiently allow fluid to flow from the inlet opening 288 through the conical shaped bore 296 and into the chamber 274 of the flow regulator 246. The inlet port 286 of the flow regulator 246 includes a stepped portion 298 which functions to secure a fluid conduit, such as the vinyl tubing fluid conduits described above, to the inlet fitting 248.

Figure 11:
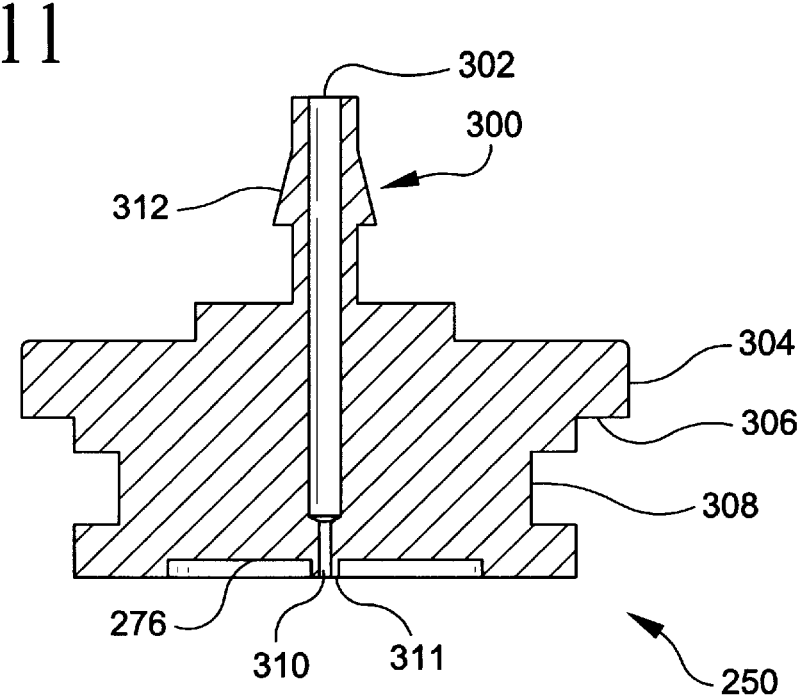
FIG. 11 is a detailed cross-sectional view of the outlet fitting of the flow regulator shown in FIG. 6.
Figure 12:
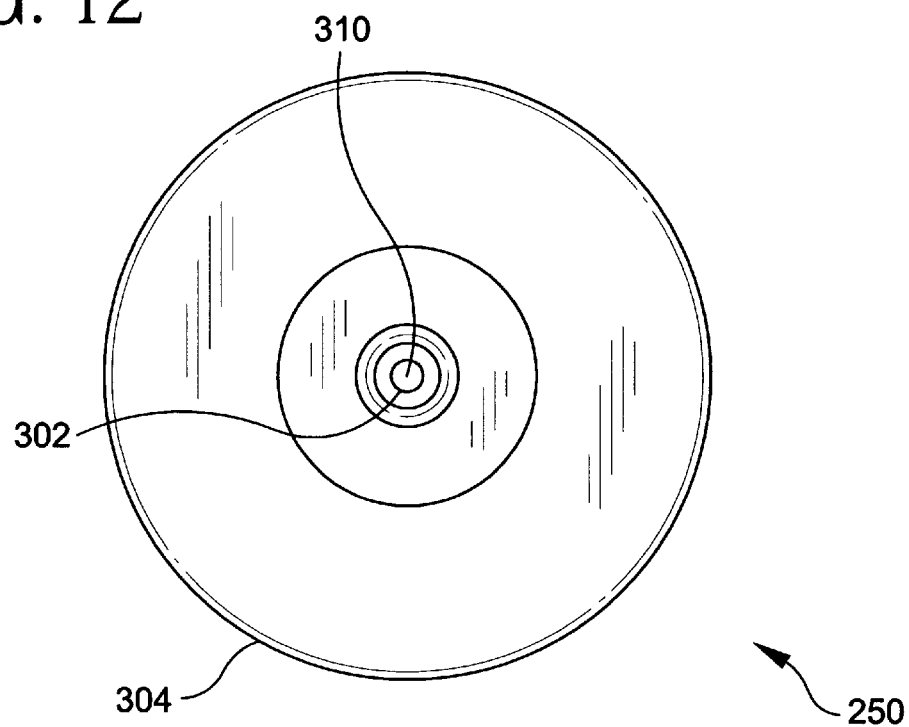
FIG. 12 is a detailed top view of the outlet fitting of the flow regulator shown in FIG. 6.

The outlet fitting 250 of the flow regulator 246 is shown in more detail in FIGS. 11 and 12. The outlet fitting 250 includes an outlet port 300 having an outlet opening 302 therein whose center is aligned with or substantially aligned with the longitudinal axis of the outlet fitting 250. The outlet fitting 250 includes a large diameter portion 304 which is cylindrical or substantially cylindrical in shape. In this example, the large diameter portion is about 0.750 inches in diameter.

The large diameter portion 304 includes a ledge portion 306 against which an edge of the glass cylinder 252 abuts when the outlet fitting 250 is coupled to the glass cylinder 252 as shown in FIG. 8. The outlet fitting further includes a recessed portion 308 whose size is sufficient to accommodate O-ring 272 when the outlet fitting 250 is coupled to the glass cylinder 252. The outlet fitting 250 further includes the recessed surface 276 against which abuts the spring 268 as described above.

As further illustrated, the outlet opening 302 is coupled to a smaller diameter control tube 310 having an end 311, the significance of which is described in more detail below. In this example, the diameter of the outlet opening 302 is about 0.040 inches, while the diameter of the control tube 310 is about 0.015 inches.

The outlet port 300 of the outlet fitting 250 includes a stepped portion 312. As with the stepped portion 298 of the inlet fitting 248, the stepped portion 312 of the outlet fitting 250 functions to secure a conduit tube, such as the vinyl conduit sections described above, to the outlet fitting 250.

Figure 13:
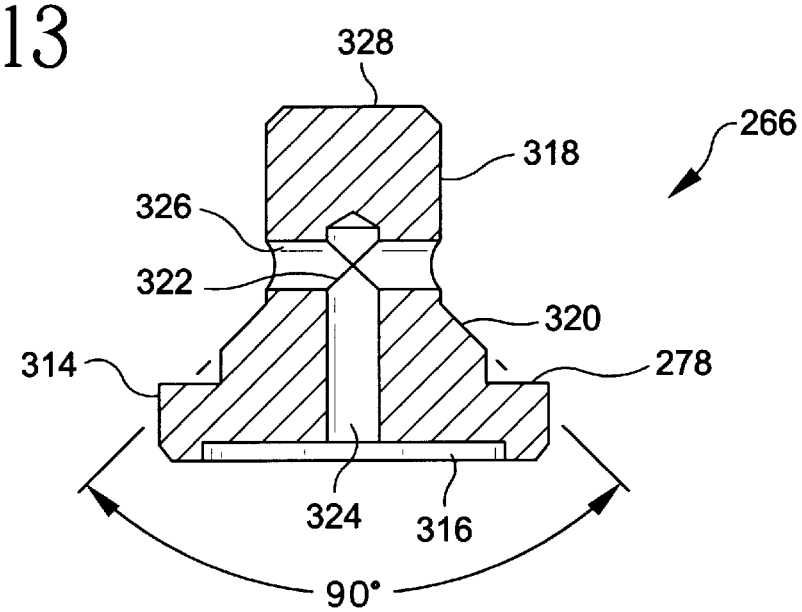
FIG. 13 is a detailed cross-sectional view of the control seat on the flow regulator shown in FIG. 6.
Figure 14:
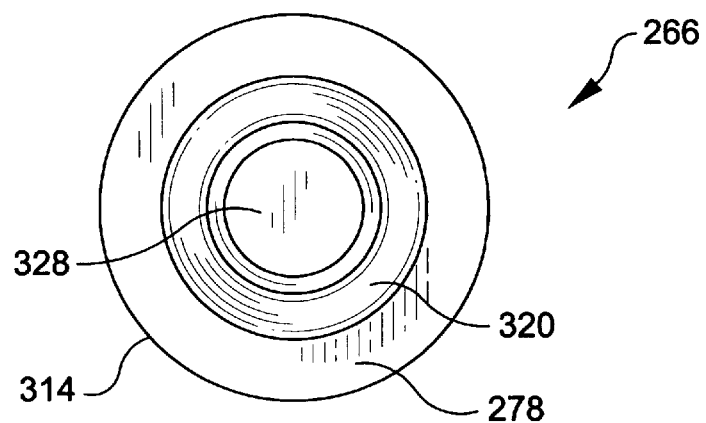
FIG. 14 is a detailed top view of the control seat of the flow regulator shown in FIG. 6.

The control seat 266 is shown in more detail in FIGS. 13 and 14. The control seat 266 can be made of any suitable material such as stainless steel, titanium, polymeric material, plastic, composite material, carbon-graphite, ceramic, glass, rubber or the like. Control seat 266 includes a base portion 314 which is cylindrically or substantially cylindrically shaped. In this example, the outer diameter of the base portion 314 is about 0.487 inches. As indicated, the stepped surface 278 which the spring 268 contacts is the top surface of the base portion 314. The base portion 314 includes a recessed portion 316 which is cylindrically or substantially cylindrically shaped and whose center is aligned with or substantially aligned with the longitudinal axis of the control seat 266.

The control seat 266 further includes a vertical portion 318 which extends upwardly from the base portion 314. As shown, the vertical bore has a conical shaped portion 320 whose wall is angled at about 45° with respect to the longitudinal axis of the control seat 266. A T-shaped opening 322 is formed in the control seat 266. The T-shaped opening 322 has a vertical bore which extends from the recessed portion 316 into the vertical portion 318 of the control seat 266. The T-shaped opening 322 further includes a horizontal bore 326 which extends horizontally or substantially horizontally through the vertical portion 318 of the control seat 266. The vertical bore 324 and the horizontal bore 326 each have a diameter of about 0.063 inches, while the recessed portion 316 has a diameter of about 0.380 inches. The vertical portion 318 further includes a horizontal or substantially horizontal top surface 328, the significance of which is described in more detail below.

Although not shown specifically, the control seat 266 and piston 254 can be integral with each other, or coupled to each other by any suitable fastening member. Furthermore, the opening 322 need not be T-shaped as shown, but could have any shape (e.g., a straight bore) suitable to allow flow of fluid therethrough to achieve the purpose described below. Also, the outer rim of the control seat 266 could be notched to allow passage of fluid to achieve the purpose described below.

Figure 15:
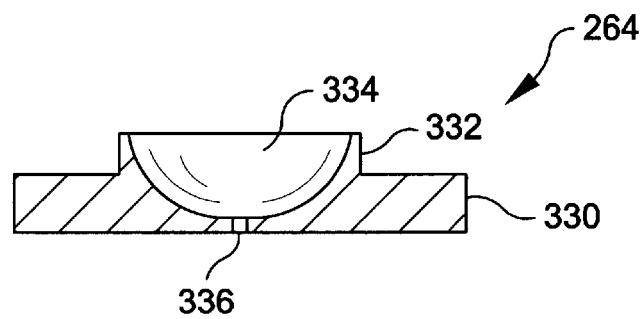
FIG. 15 is a detailed cross-sectional view of the hemispherical orifice member of the flow regulator shown in FIG. 6.

FIG. 15 is a detailed cross-sectional view of the orifice member 264. The orifice 264 is made of sapphire, but can be made of any other suitable material. The orifice member 264 includes a large diameter cylindrical portion 330 and a small diameter cylindrical portion 332. In this example, the diameter of the large diameter cylindrical portion 330 is about 0.180 inches, and the diameter of the small diameter cylindrical portion 332 is about 0.096 inches.

The orifice member 264 further includes a hemispherical cavity 334 whose axial center is aligned with or substantially aligned with the longitudinal axis of the orifice member 264. In this example, the hemispherical cavity has a radius of curvature of about 0.0472 inches. The orifice member 264 further includes a cylindrical or substantially cylindrical opening 336 which communicates with the hemispherical cavity 334. Thus, the opening 336 and the hemispherical cavity 334 allow the passage of fluid through the orifice member 264. The diameter of the opening 336 can be made at any appropriate size to allow a desired rate of flow of the fluid through the orifice member 264. For example, the diameter of the opening 336 can be 0.0060 inches, 0.0073 inches, 0.0100 inches, 0.0104 inches, 0.0147 inches, or any other suitable dimension for a desired flow rate.

The operation of the flow regulator 246 will now be described.

As stated above, the flow regulator 246 can be employed at the flow regulator 128 in a sheath fluid delivery system 100, or as flow regulators 208, 210 and 212 in the sheath fluid delivery system 155. When no pressurized sheath fluid is being provided to the inlet port 286, the force exerted by spring 268 on the control seat 266 urges the control seat 266 to contact the inner surface 280 of the bottom portion 256 of the piston 254. The force of spring 268 further urges the piston 254 toward the inlet fitting 248, so that the outer surface 282 of the bottom of the piston 254 contacts the upper surface 284 of the inlet fitting 248.

When pressurized fluid, such as pressurized sheath fluid, is supplied at the inlet port 286 of the inlet fitting 248, the pressurized fluid flows through inlet opening 288 and into conical shaped bore 296 of the inlet fitting 248. This pressurized fluid exerts a force on the piston 254 which begins to overcome the force applied to the piston 254 via control seat 266 by spring 268. The pressurized fluid begins to accumulate in the upstream portion 274-1 of chamber 274, and also flows through the opening 336 and the hemispherical cavity 334 in the orifice member 264. Thus, the fluid flows through the opening 262 in the bottom portion 256 of the piston. That fluid continues to flow through the T-shaped opening 322 in the control seat 266, and out into the downstream portion 274-2 of chamber 274 of the flow regulator 246.

As the pressurized fluid exerts the force on the piston 254 which overcomes the force exerted by spring 268, the piston begins to move in the direction indicated by arrow A in FIG. 8 toward the outlet fitting 250. Because the control seat 266 is inside the cavity 260 in the piston 254, the movement of the piston 254 in the direction indicated by arrow A will move the control seat 266 in the direction indicated by arrow A. As the piston moves in the direction of arrow A, the fluid in the downstream portion 274-2 of chamber 274 is discharged through the control tube 310 in the outlet fitting 250, and thus passes through the outlet opening 302 and out of the outlet fitting 250.

Figure 16:
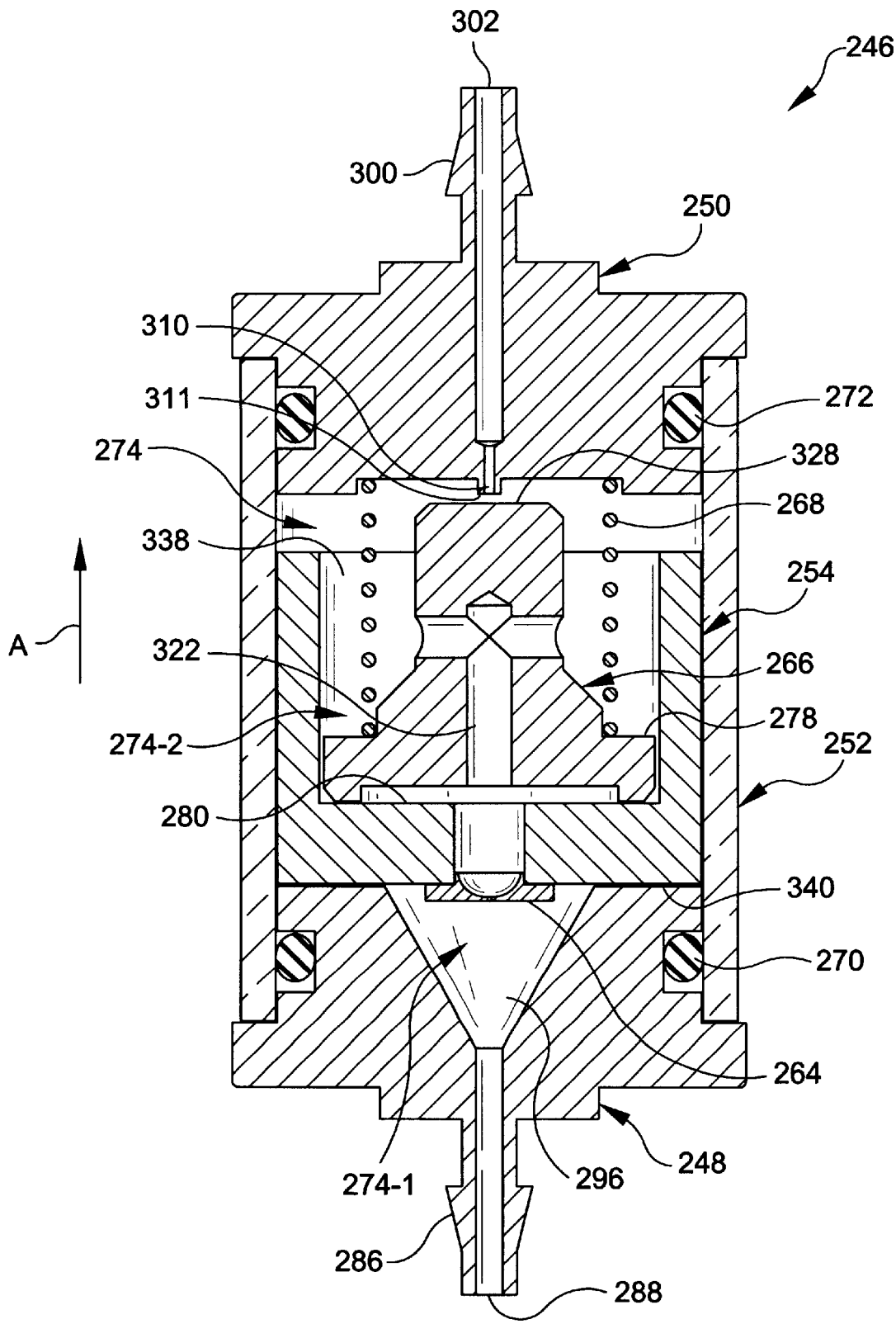
FIG. 16 is a cross-sectional view of the flow regulator of FIG. 6, which illustrates the control seat in a position closing the control tube.
Figure 17:
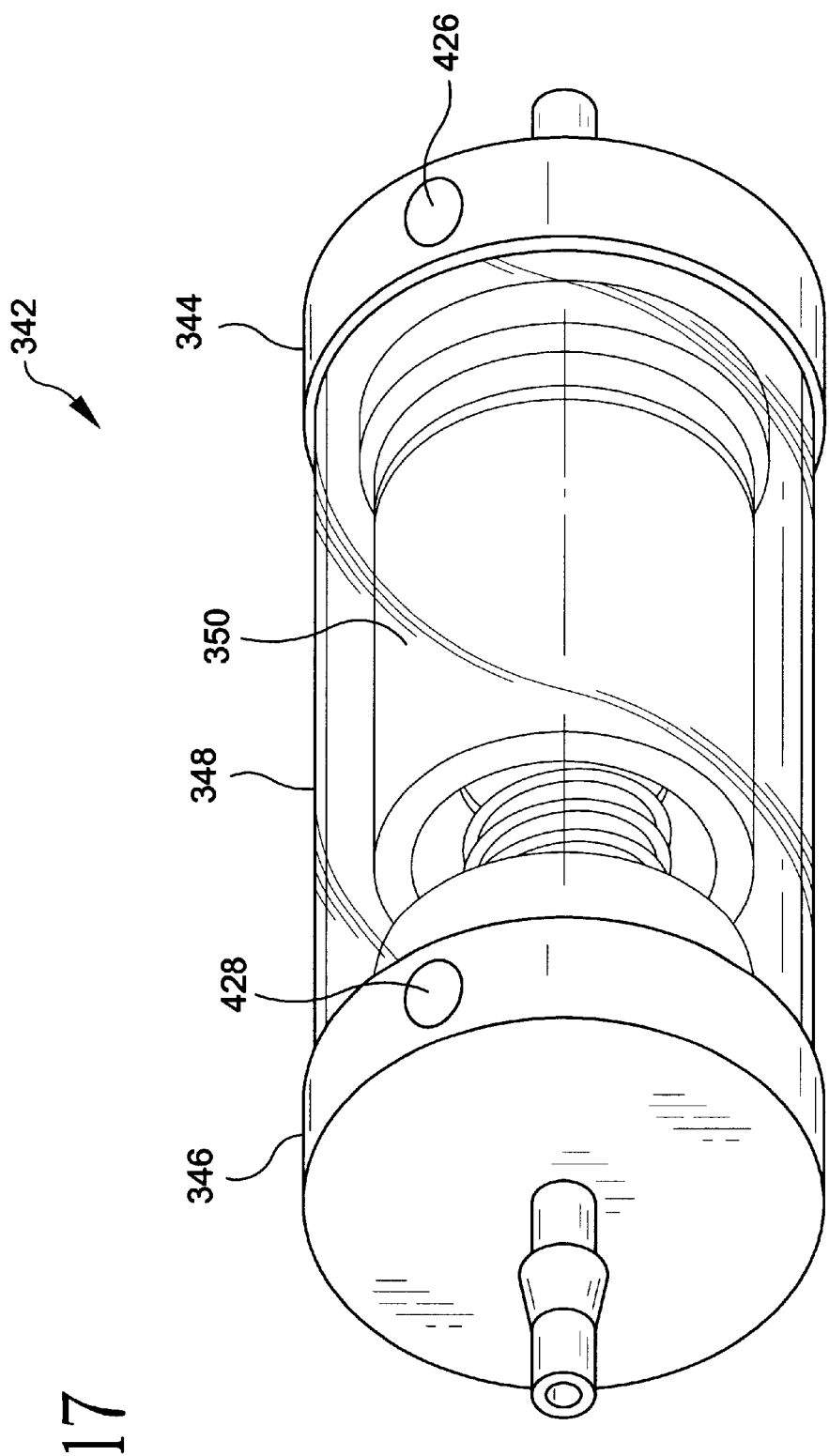
FIG. 17 is a perspective view of another embodiment of a flow regulator according to the present invention.

As shown in FIG. 16, as the piston 254 and the control seat 266 continue to move in the direction along arrow A, the top surface 328 approaches the portion of the outlet fitting 250 in which the control tube 310 is formed. The top surface 328 of the control seat 266 will come within a distance from the end 311 of the control tube 310 which will create and maintain an equilibrium fluid pressure between the upstream portion 274-1 and downstream portion 274-2 of chamber 274 as will now be described.

The equilibrium condition that occurs in the flow regulator 246 can be represented by the following equation:

$$\uparrow P_1 A_1 = \downarrow F + \downarrow P_2(A_1 - A_3) + \downarrow P_3 A_3$$

with:

$P_1$ being the fluid pressure in the upstream portion 274-1 of chamber 274;

$A_1$ being the cross-sectional area of the upstream portion 274-1 of the chamber 274 (e.g., $\pi r^2$ with r being the radius of the inner diameter of cylinder 252), which is essentially equal to the cross-sectional area of the bottom portion 256 of the piston 254;

$P_2$ being the fluid pressure in the downstream portion 274-2 of chamber 274;

$P_3$ being the fluid pressure in control tube 310;

$A_3$ being the cross-sectional area of the opening in control tube 310;

$P_1 A_1$ being the force exerted on the piston 254 by the pressurized fluid in the upstream portion 274-1 of chamber 274;

F being the force exerted by the spring 268 on the control seat 266 and piston 254;

$P_2(A_1-A_3)$ being the force exerted on the control seat 266 and piston 254 by the fluid pressure in the downstream portion 274-2 of chamber 274; and $P_3 A_3$ being the force exerted on the control seat 266 and piston 254 due to the downstream pressure of the fluid which fluid flows through control tube 310 and out let opening 302 in the outlet fitting 250 into a conduit downstream of the flow regulator 246.

The above equation can be rearranged as follows:

$$P_1 - P_2 = F/A_1 + A_3/A_1(P_3 - P_2)$$

Because the diameter of the control tube 310 is small, the term $A_3/A_1(P_3-P_2)$ approaches 0. Therefore, the resulting equilibrium condition is, in effect, governed by the following equation:

$$P_1 - P_2 = F/A_1$$

which indicates that the pressure difference between the fluid in the downstream portion 274-2 of the chamber 274 and the upstream portion 274-1 of the chamber 274 (upstream of the orifice member 264) is dependent on the force F applied to the piston 254 by the spring 268. The flow regulator 246 automatically achieves the equilibrium control pressure difference $P_1-P_2$, or $\Delta P$, by maintaining an appropriate clearance between the end 311 of the control tube 310 and the top surface 328 of the control seat 266, which allows the fluid to flow from the downstream portion 274-2 of chamber 274 into control tube 310 to create the correct pressure $P_2$ in the downstream portion 274-2 of the chamber for a fluid supplied at a given supply pressure $P_1$ and exiting the flow regulator 246 through control tube 110 at a downstream pressure $P_3$.

It is noted that the flow regulator 246 automatically maintains the appropriate clearance between the end 311 of the control tube 310 and the top surface 328 of the control seat 266 to maintain the equilibrium control pressure difference $P_1-P_2$, or $\Delta P$, constant independent of the magnitudes of the supply pressure $P_1$ and the downstream pressure $P_3$. That is, the clearance between the end 311 of the control tube 310 and the top surface 328 of the control seat 266 self-adjusts with changes in the supply pressure $P_1$ and the downstream pressure $P_3$ to maintain a constant equilibrium control pressure difference $P_1-P_2$, or $\Delta P$, across the orifice member 264, to thus maintain a constant flow rate of the fluid entering the control tube 310 from the downstream portion 274-2 of the chamber 274.

For example, if the magnitude of the supply pressure $P_1$ increases, the clearance between the end 311 of the control tube 310 and the top surface 328 of the control seat 266 self-adjusts to increase the magnitude of the pressure $P_2$ of the fluid in downstream chamber 274-2 so that the equilibrium control pressure difference $P_1-P_2$, or $\Delta P$, across orifice member 264 remains constant. Specifically, the clearance between the end 311 of the control tube 310 and the top surface 328 of the control seat 266 will decrease, which causes the magnitude of the pressure $P_2$ of the fluid in downstream chamber 274-2 to increase to the appropriate level to maintain the constant $\Delta P$.

On the other hand, if the magnitude of the supply pressure $P_1$ decreases, the clearance between the end 311 of the control tube 310 and the top surface 328 of the control seat 266 self-adjusts to decrease the magnitude of the pressure $P_2$ of the fluid in downstream chamber 274-2 so that the equilibrium control pressure difference $P_1-P_2$, or $\Delta P$, across orifice member 264 remains constant. Specifically, the clearance between the end 311 of the control tube 310 and the top surface 328 of the control seat 266 will increase, which causes the magnitude of the pressure $P_2$ of the fluid in downstream chamber 274-2 to decrease to the appropriate level to maintain the constant $\Delta P$.

Similarly, if the magnitude of the downstream pressure $P_3$ increases or decreases, the clearance between the end 311 of the control tube 310 and the top surface 328 of the control seat self-adjusts (i.e., increases or decreases, as appropriate) to maintain the magnitude of the pressure the pressure $P_2$ of the fluid in downstream chamber 274-2 constant so that the equilibrium control pressure difference $P_1-P_2$, or $\Delta P$, across orifice member 264 remains constant.

It is also noted that in order for the flow regulator 274 to provide a constant flow rate, the orifice member 264 must provide a substantially fixed restriction to fluid flow between the upstream portion 274-1 of chamber 274 and the downstream portion 274-2 of the chamber 274. That is, the purpose of the orifice member 264 is to prevent a developed flow of fluid therethrough, because developed fluid flow is influenced by the viscosity of the fluid.

The equation which governs the flow of fluid through the orifice member 264 is as follows:

$$Q \, C_d A (\Delta P/\gamma)^{1/2}$$

where:

Q represents the volumetric flow rate;

$C_d$ represents the coefficient of discharge of the orifice;

A represents the cross-sectional area of the orifice;

$\Delta P$ represents the pressure differential across the orifice; and $\gamma$ represents the specific gravity of the fluid.

Although the discharge coefficient $C_d$ of the orifice member 264 is a function of the geometry and scale of the orifice member and, in some instances, the Reynolds number of the fluid, the flow rate of fluid through the orifice member 264 is not developed and thus is relatively independent of the viscosity of the fluid, which is significantly affected by temperature. Therefore, the flow of fluid through the orifice member 264 is essentially unaffected by temperature.

For example, the viscosity of water changes about 50% with a change in temperature from 15° C. to 35° C. Therefore, if the fluid is water or has properties similar to water, were the fluid restrictor to be a tube, for example, where the flow is developed, the flow rate of the fluid would be significantly affected by the viscosity of the fluid and thus would be significantly affected by changes in temperature. However, it is also noted that the specific gravity $\gamma$ of water changes by only about 0.5% for a change in temperature from 15° C. to 35° C. Furthermore, as indicated by the above equation, the flow rate of a fluid through an orifice is proportional to the square root (i.e., $\gamma^{1/2}$) of the specific gravity of the fluid. Hence, only about a 0.25% change in flow rate of the fluid through the orifice occurs for a change in specific gravity of 0.5%.

It is also noted that a capillary tube can be used in place of orifice member 264. However, flow of fluid through a capillary tube is not as independent of the viscosity of the fluid as is the flow of fluid through an orifice as explained above. Accordingly, the fluid flow rate is maintained more constant with the use of an orifice member.

For all the above reasons, the arrangement of the piston 254, orifice member 264 and control seat 266 of the flow regulator 246 provide a fixed or essentially fixed flow rate of the sheath fluid through the flow regulator 246.

It is noted that the flow rate to be maintained by a flow regulator 246 can be changed in several ways. For example, the diameter of the orifice can be changed, which would provide a greater rate of flow through the orifice. Also, as can be appreciated from the equilibrium condition equation discussed above, the equilibrium control pressure difference $P_1-P_2$, or $\Delta P$, is dependent on the spring force F and the cross sectional area $A_1$ of the upstream portion 274-1 of the chamber 274. Hence, by changing the cross sectional area of the chamber 274 of the flow regulator 246, or by changing the spring force F imposed on the control seat 266 and piston 254, the equilibrium control pressure difference $P_1-P_2$, or $\Delta P$ is changed. Therefore, in the flow regulator 246, the clearance between the end 311 of the control tube 310 and the top surface 328 of the control seat 266 self-adjusts with changes in the supply pressure $P_1$ and the downstream pressure $P_3$ to maintain this changed constant equilibrium control pressure difference $P_1-P_2$, or $\Delta P$, across the orifice member 264, which results in a different constant flow rate of the fluid entering the control tube 310 from the downstream portion 274-2 of the chamber 274.

Another embodiment of the flow regulator according to the present invention is shown in FIGS. 17–24. Flow regulator 342 is similar in most respects to flow regulator 246 described above, in that it includes an inlet fitting 344, an outlet fitting 346, a glass cylinder 348, a piston 350, an orifice member 352, a control seat 354, a spring 356 and O-rings 358 and 360. Because all of the components in the flow regulator 342 except for the inlet fitting 344, outlet fitting 346 and orifice member 352 are identical to those discussed above with regard to their corresponding components in flow regulator 246, they will not be discussed in detail.

As evident from the figures, piston 350 is similar to piston 254 in that it includes a bottom portion 362 having an opening 364 therein, and a cylindrical wall portion 366 which together with the bottom portion 362 form a cavity 368 in the piston 350. Like control seat 266, control seat 354 includes a base portion 370 having a stepped surface 371 which is contacted by spring 356, a recessed portion 372, a vertical portion 374 which extends from the base portion 370, and a T-shaped opening 376 which extends through the base portion 370 and vertical portion 374. The control seat 354 also includes a top surface 378 whose purpose is similar to that of top surface 328 of control seat 266. As with control seat 266, control seat 354 can be integral with or secured to piston 350, and opening 376 can be of a shape other than T-shaped.

Figure 18:
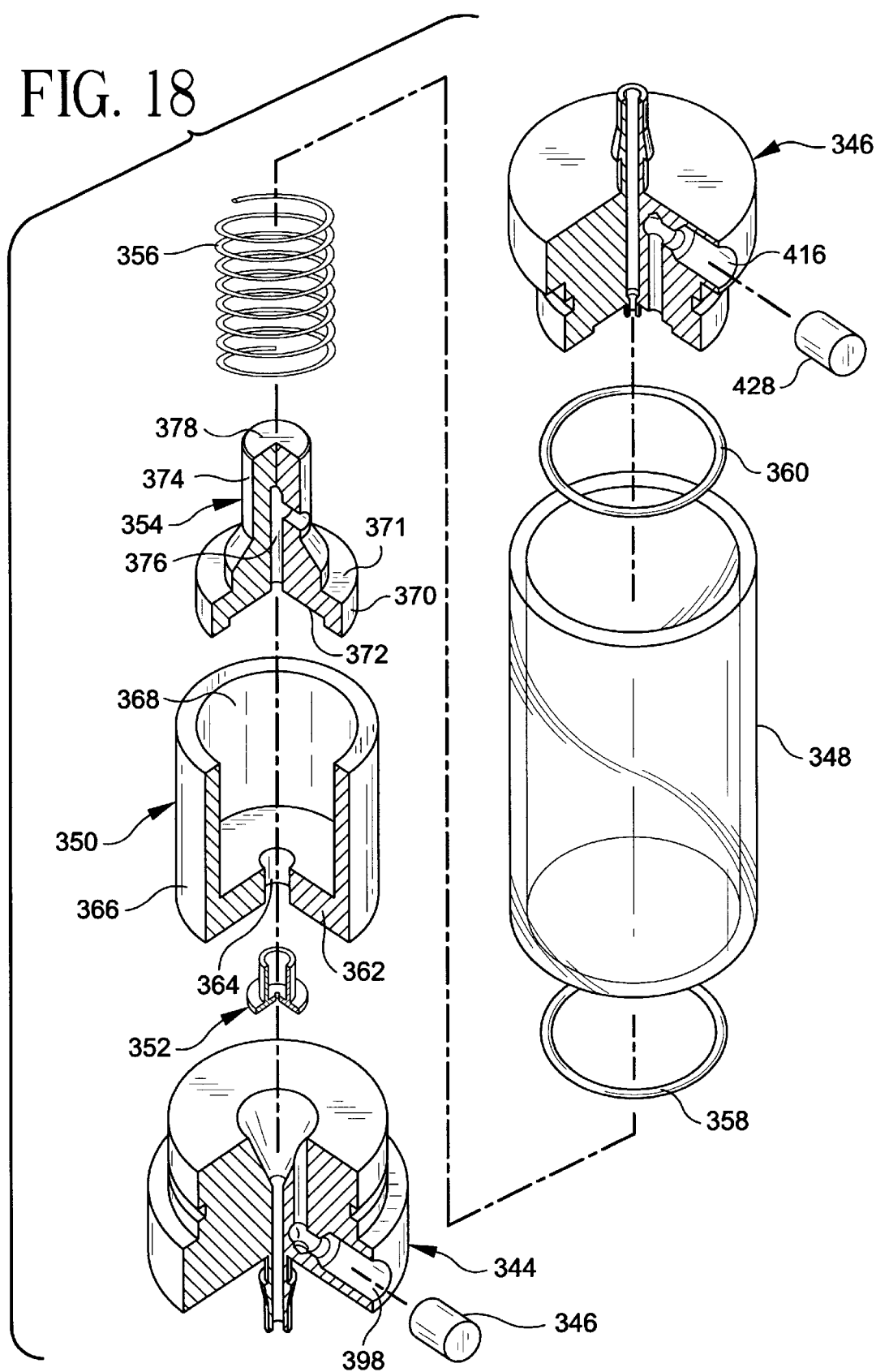
FIG. 18 is an exploded perspective view of the flow regulator shown in FIG. 17.
Figure 19:
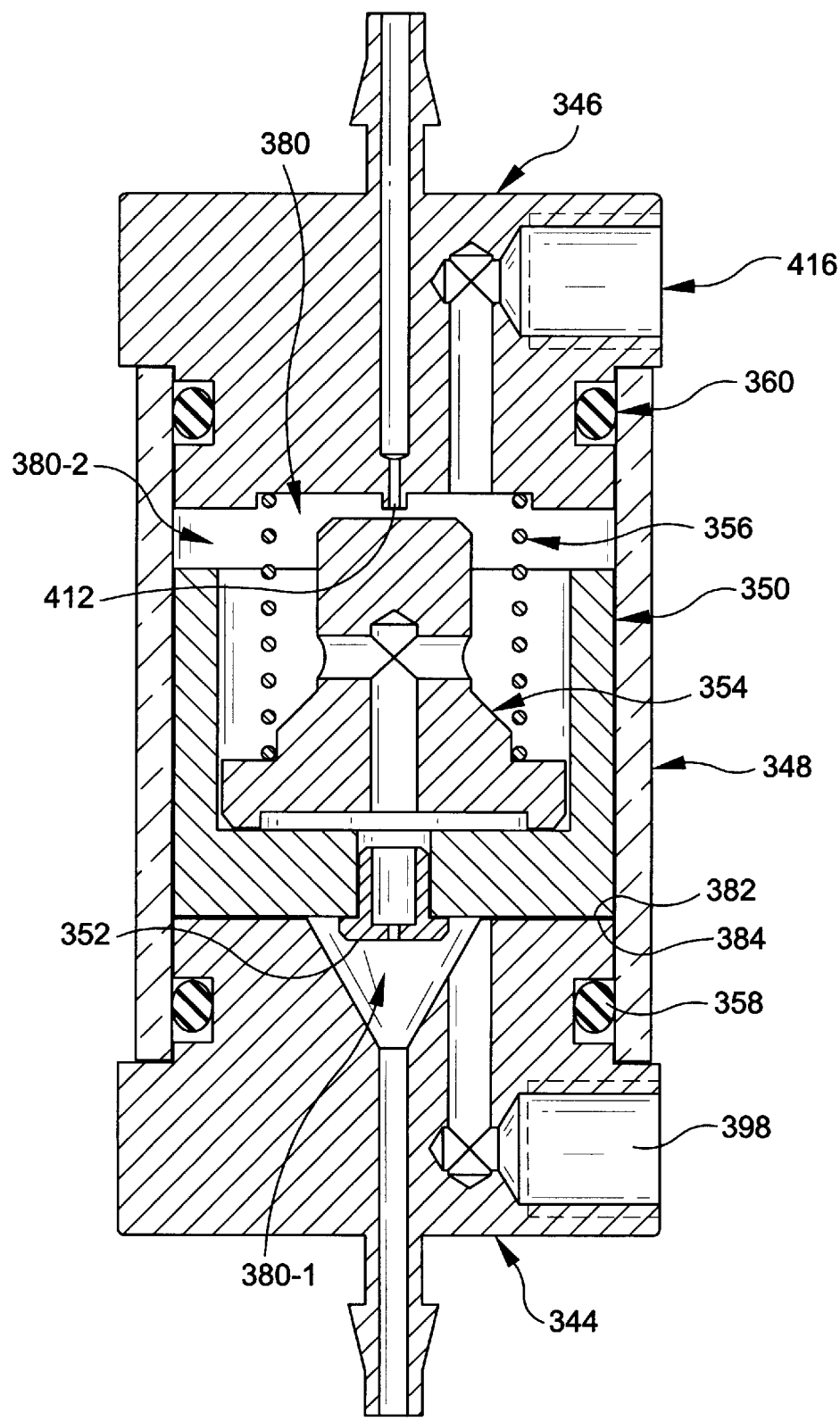
FIG. 19 is a cross-sectional view of the flow regulator shown in FIG. 17.

As shown in FIG. 18, for example, the inlet fitting 344 and outlet fitting 346 are coupled to the ends of the glass cylinder 348 such that a chamber 380 is formed in the flow regulator 342. The piston 350, orifice member 352, control seat 354 and spring 356 are disposed in the chamber 380 in a manner similar to their corresponding components in the flow regulator 246. The orifice member 352 divides the chamber 380 into an upstream portion 380-1 and a downstream portion 380-2. When no pressurized fluid is input into the inlet fitting 344, the spring 356 urges the control seat 354 and piston 350 in a direction toward the inlet fitting 344 such that the outer surface 382 of the piston contacts the upper surface 384 of the inlet fitting.

Figure 20:
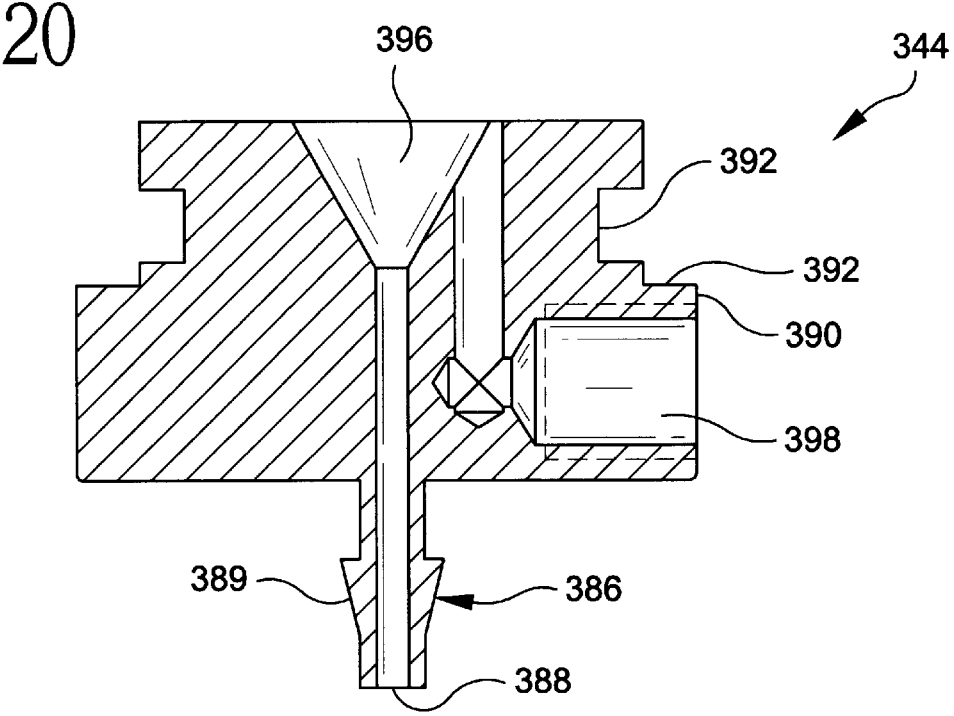
FIG. 20 is a detailed cross-sectional view of the input fitting of the flow regulator shown in FIG. 17.
Figure 21:
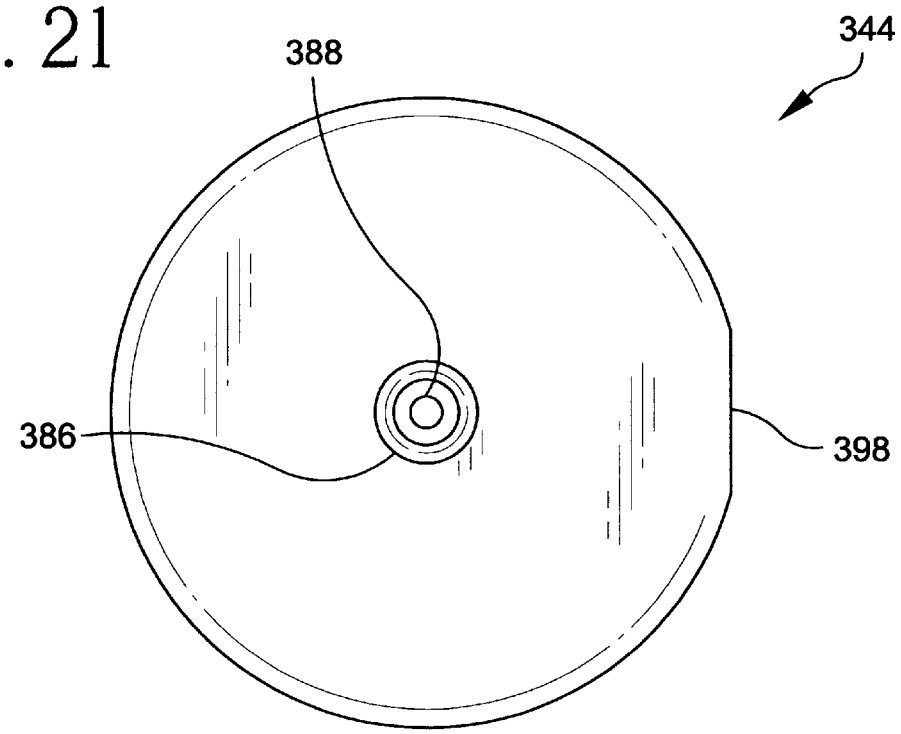
FIG. 21 is a detailed top view of the input fitting of the flow regulator shown in FIG. 17.

The inlet fitting 344 is shown in detail in FIGS. 20 and 21. Like inlet fitting 248 in the flow regulator 246, inlet fitting 344 includes an inlet port 386 having an inlet opening 388 therein, and a stepped portion 389 which functions to secure a conduit to the inlet port 386. The diameter of the inlet opening 388 is about 0.040 inch, which is similar to that of the inlet opening in the inlet fitting 248. The inlet fitting 344 also includes a large diameter portion 390 having a ledge portion 392 against which the glass cylinder 348 abuts when the inlet fitting 344 is coupled to the glass cylinder 348. The inlet fitting also includes a recessed portion 392 which accommodates O-ring 358 when the inlet fitting 344 is coupled to the glass cylinder 348.

Further similar to inlet fitting 248, inlet fitting 344 includes a conical shaped bore 396 which communicates with inlet opening 388 to allow fluid to pass into the upstream portion 380-1 chamber 380 of the flow regulator 342. However, unlike inlet fitting 248, inlet fitting 344 includes a side port 398 which communicates with the conical shaped bore 396. The significance of this side port 398 is described in more detail below.

Figure 22:
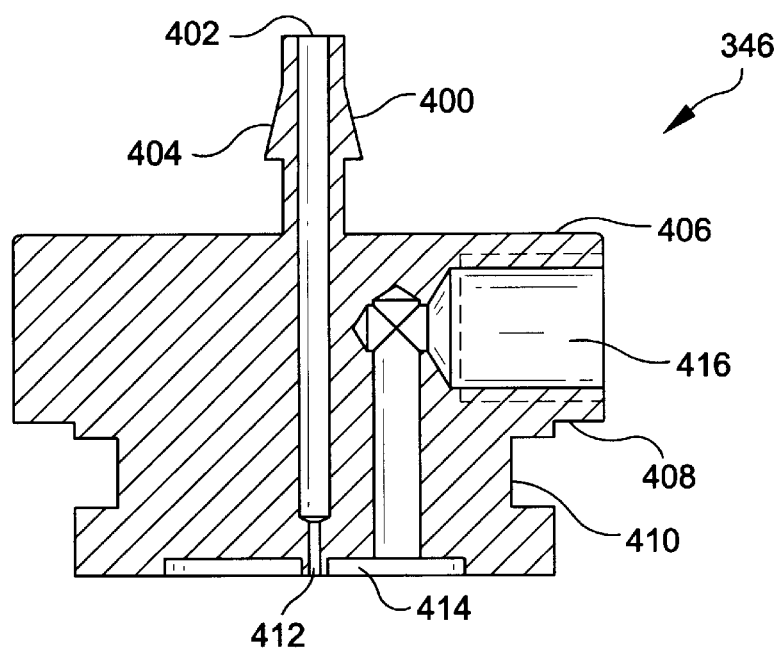
FIG. 22 is a detailed cross-sectional view of the outlet fitting of the flow regulator shown in FIG. 17.
Figure 23:
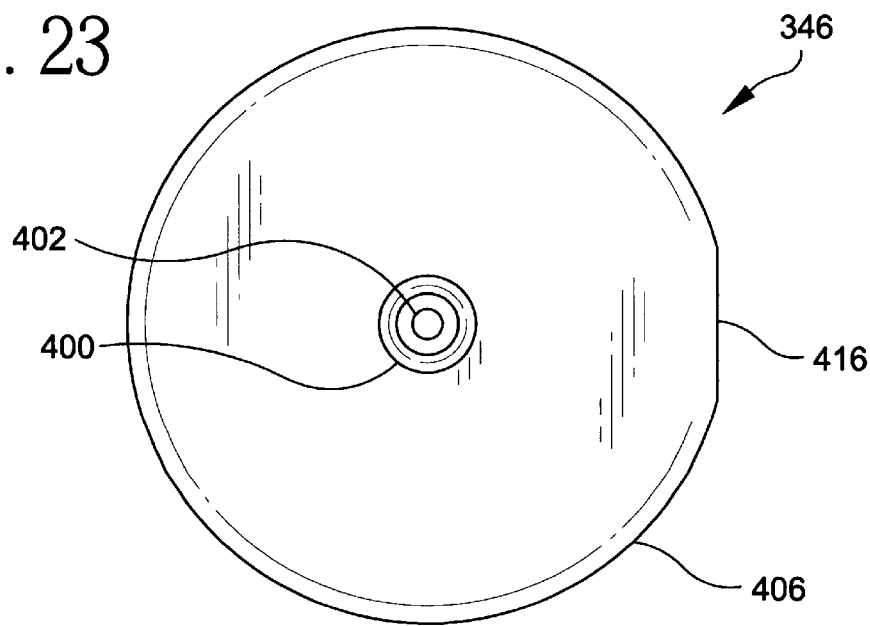
FIG. 23 is a detailed top view of the outlet fitting of the flow regulator shown in FIG. 17.

The outlet fitting 346 is shown in more detail in FIGS. 22 and 23. Like outlet fitting 250 of flow regulator 246, outlet fitting 346 includes an outlet port 400 having an outlet opening 402 therein, and a stepped portion 404 which functions to secure a conduit to the outlet port. The outlet fitting 346 also includes a large diameter portion 406 having a ledge portion 408 which rests against an edge of glass cylinder 348 when the outlet fitting 346 is coupled to the glass cylinder 348. The outlet fitting further includes a recessed portion 410 whose size is sufficient to receive O-ring 360 when the outlet fitting 346 is coupled to the glass cylinder 348.

The outlet fitting 346 further includes a control tube 412 which communicates with the outlet opening 404 and is sized in proportion with the outlet opening 404 in a manner similar to that in which control tube 310 is sized with respect to outlet opening 302 in outlet fitting 250 described above. The outlet fitting 346 further includes a recessed surface 414 which is similar to recessed surface 276 of outlet fitting 250 described above. One end of the spring 356 contacts the recessed surface 414, and the other end of spring 356 contacts the stepped surface 371 of control seat 354 when the flow regulator 342 is assembled. However, unlike inlet fitting 250, inlet fitting 346 includes a side port 416, the significance of which is described below.

Figure 24:
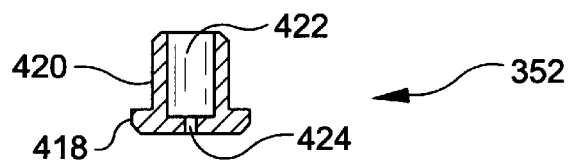
FIG. 24 is a detailed cross-sectional view of an orifice member of the flow regulator shown in FIG. 17.

FIG. 24 is a detailed cross-sectional view of orifice member 352. Unlike orifice member 264, which has a hemispherical cavity therein, orifice member 352 includes a large diameter portion 418 which is cylindrical or substantially cylindrical in shape, and a small diameter portion 420 which is also cylindrical or substantially cylindrical in shape. The small diameter portion 420 includes a cylindrical recess 422 therein, whose longitudinal axis is aligned with or substantially aligned with the longitudinal axis of the orifice member 352. The large diameter portion 418 also includes a cylindrical or substantially cylindrical opening 424 therein whose longitudinal axis is aligned with or substantially aligned with the longitudinal axis of the orifice member 352. The cylindrical openings 422 and 424 communicate with each other to provide an essentially steady non-developed flow of fluid therethrough. Hence, as with orifice member 264 discussed above, the flow of fluid through orifice member 352 is essentially unaffected by the viscosity (and thus the temperature) of the fluid.

It is noted that in the flow regulator 246, orifice member 352 can be used instead of orifice member 264. Likewise, in flow regulator 342, orifice member 264 can be used in place of orifice member 352.

As described above, flow regulator 342 functions substantially identically to flow regulator 246 to maintain a constant volumetric flow rate which is unaffected or essentially unaffected by changes in pressure, temperature and viscosity of the fluid. If flow regulator 342 is to be used in an application similar to that in which flow regulator 246 is used, plugs 426 and 428 are inserted into side ports 398 and 416 of the inlet fitting 344 and outlet fitting 346, respectively, prior to use. These plugs prevent communication between the upstream portion 380-1 and downstream portion 380-2 of chamber 380 and the environment outside the flow regulator 342 through ports 398 and 416, respectively. In this event, the flow regulator 342 functions essentially identically to the flow regulator 246 as described above.

Figure 25:
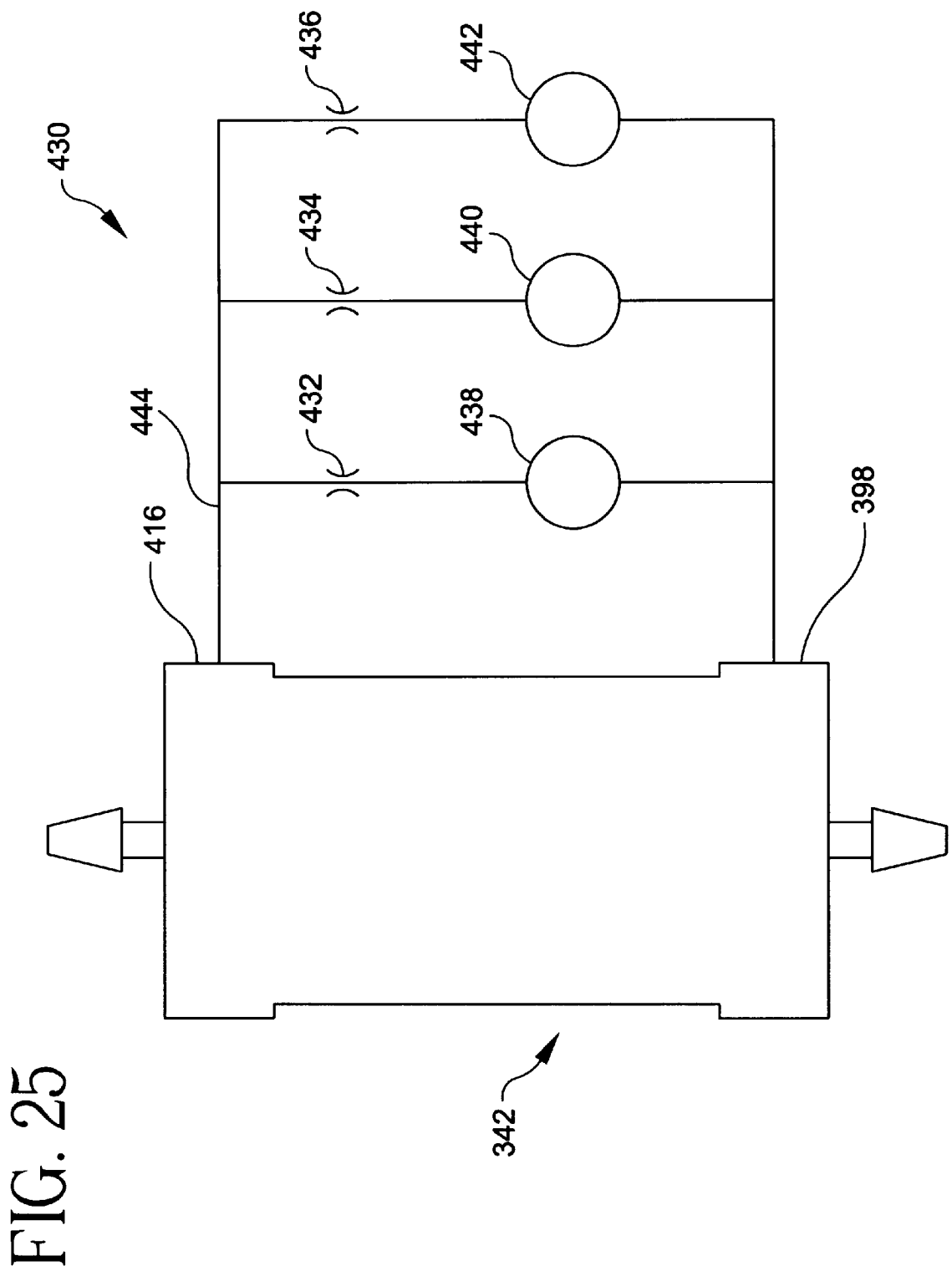
FIG. 25 is a schematic illustration of the flow regulator of FIG. 17 coupled to flow valves in accordance with an embodiment of the present invention.
Figure 26:
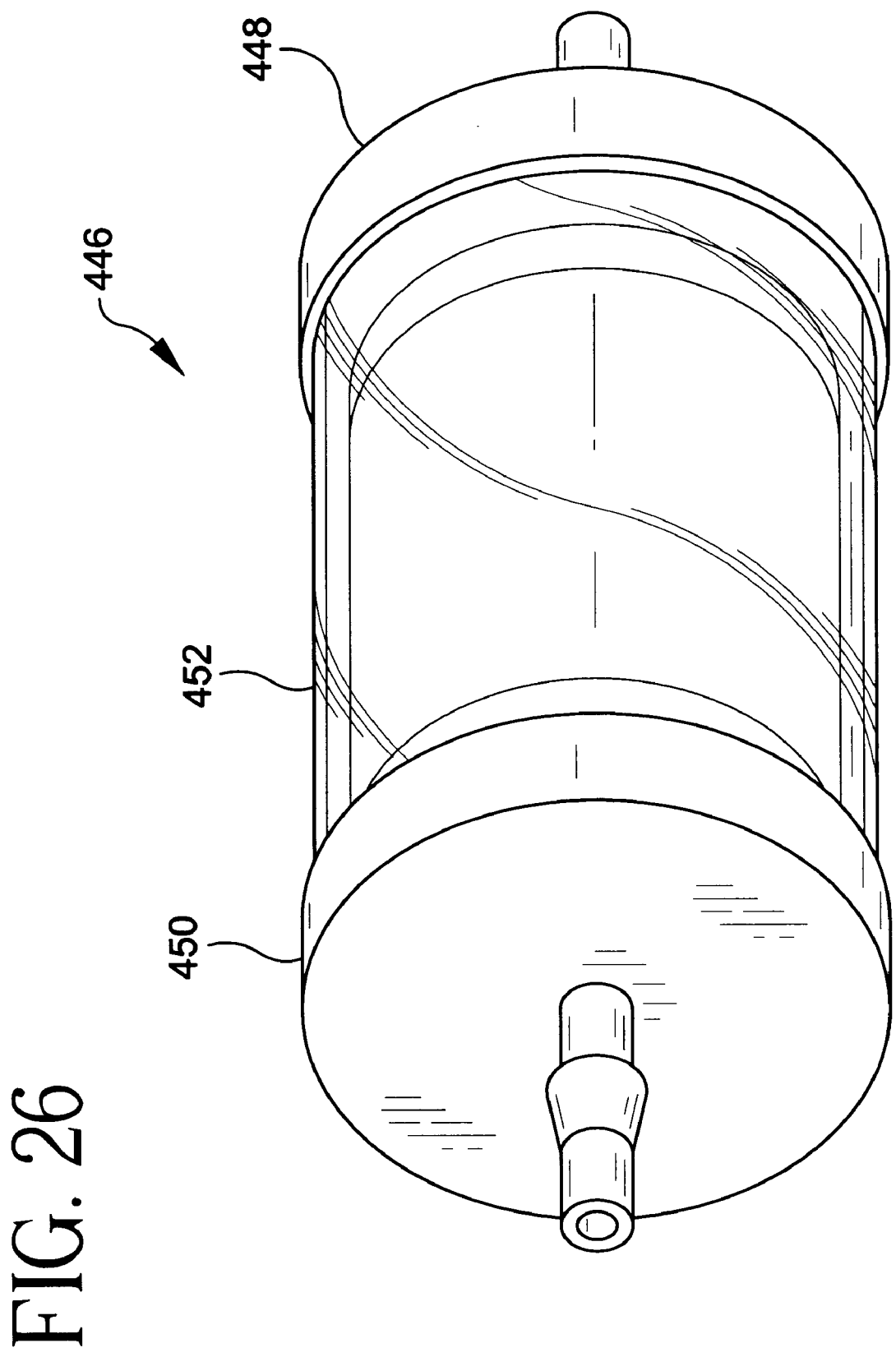
FIG. 26 is a perspective view of another embodiment of a flow regulator according to the present invention.

However, as shown schematically in FIG. 25, the ports 398 and 416 can be coupled to a plurality of orifice and valve connections of an orifice and valve assembly 430. That is, a plurality of orifices 432, 434 and 436, and corresponding valves 438, 440, and 442, can be coupled via a fluid conduit system 444 to side ports 398 and 416 of the flow regulator 342. These orifices 432, 434 and 436 have openings therein which are sized to allow fluid to flow through their corresponding valves 438, 440 and 442 at respective flow rates unaffected or essentially unaffected by the viscosity of the fluid. For instance, the orifice 432, 434 and 436 can be sized to allow fluid to flow at a stable rate of 5 ml/min, 10 ml/min/ and 20 ml/min, respectively. Also, the flow regulator 342 could have a spring 356 and orifice member 352 configured such that the flow regulator 342 provides a stable flow rate of 5 ml/min. Accordingly, by closing or opening valves 438, 440 and 442 in desired combinations, the volumetric flow rate of the fluid which is to be maintained can be set from a minimum of 5 ml/min to a maximum of 40 ml/min in 5 ml/min increments. Also, instead of orifice member 352, a plug (not shown) can be inserted in opening 364 in the bottom portion 362 of piston 350. In this event, fluid flows into upstream chamber 380-1, through port 398 and through those of orifices 432, 434 and 436 whose associated valves 438, 440 and 442, respectively, are open, into downstream chamber 380-2 through port 416, and out control tube 412. In this event, the flow rate can be set from zero (all valves 438, 440 and 442 closed) to a maximum of 35 ml/min, in 5 ml/min increments depending on which valves 438, 440 and 442 are open.

Figure 27:
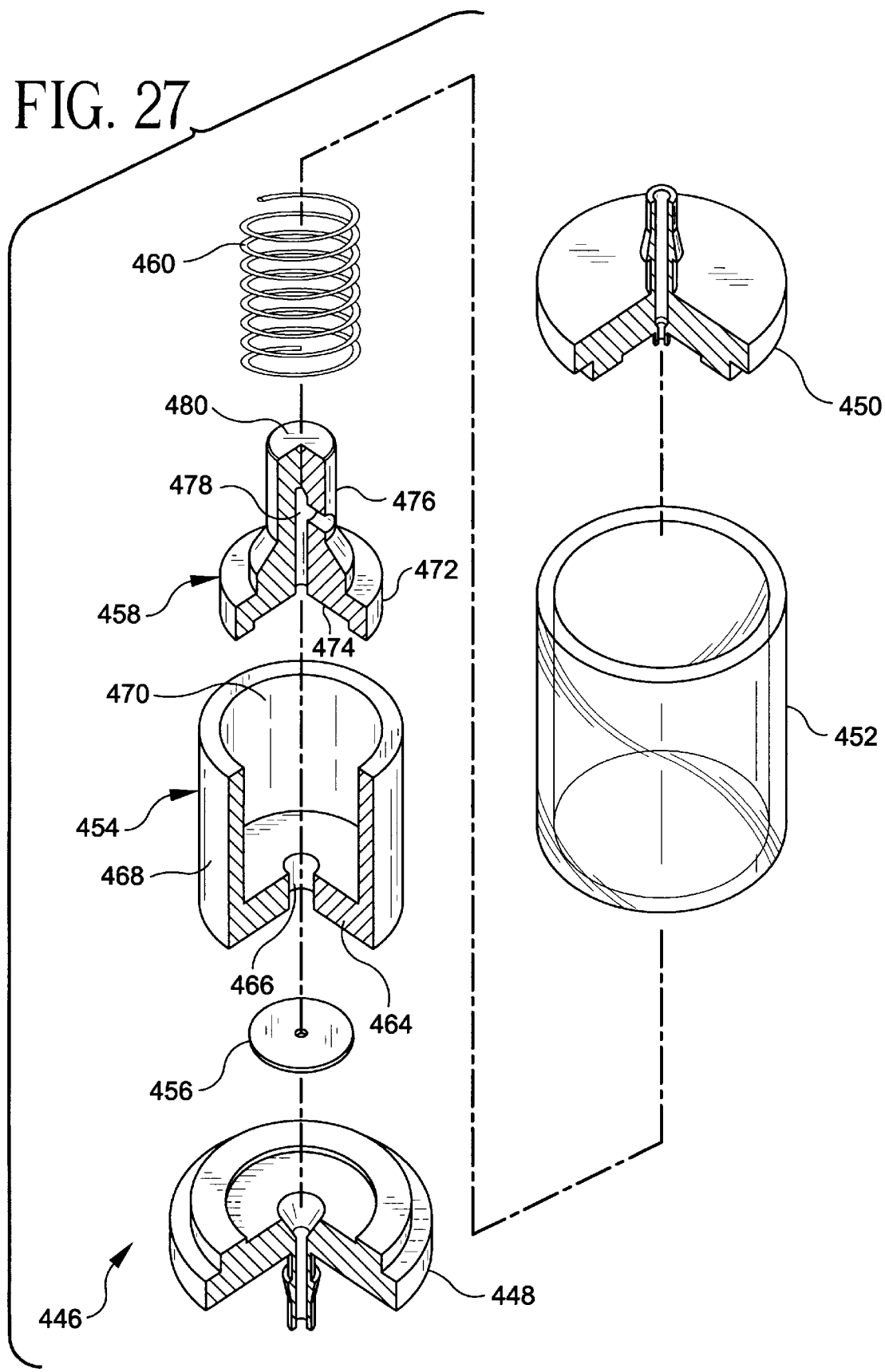
FIG. 27 is an exploded perspective view of the flow regulator shown in FIG. 26.
Figure 28:
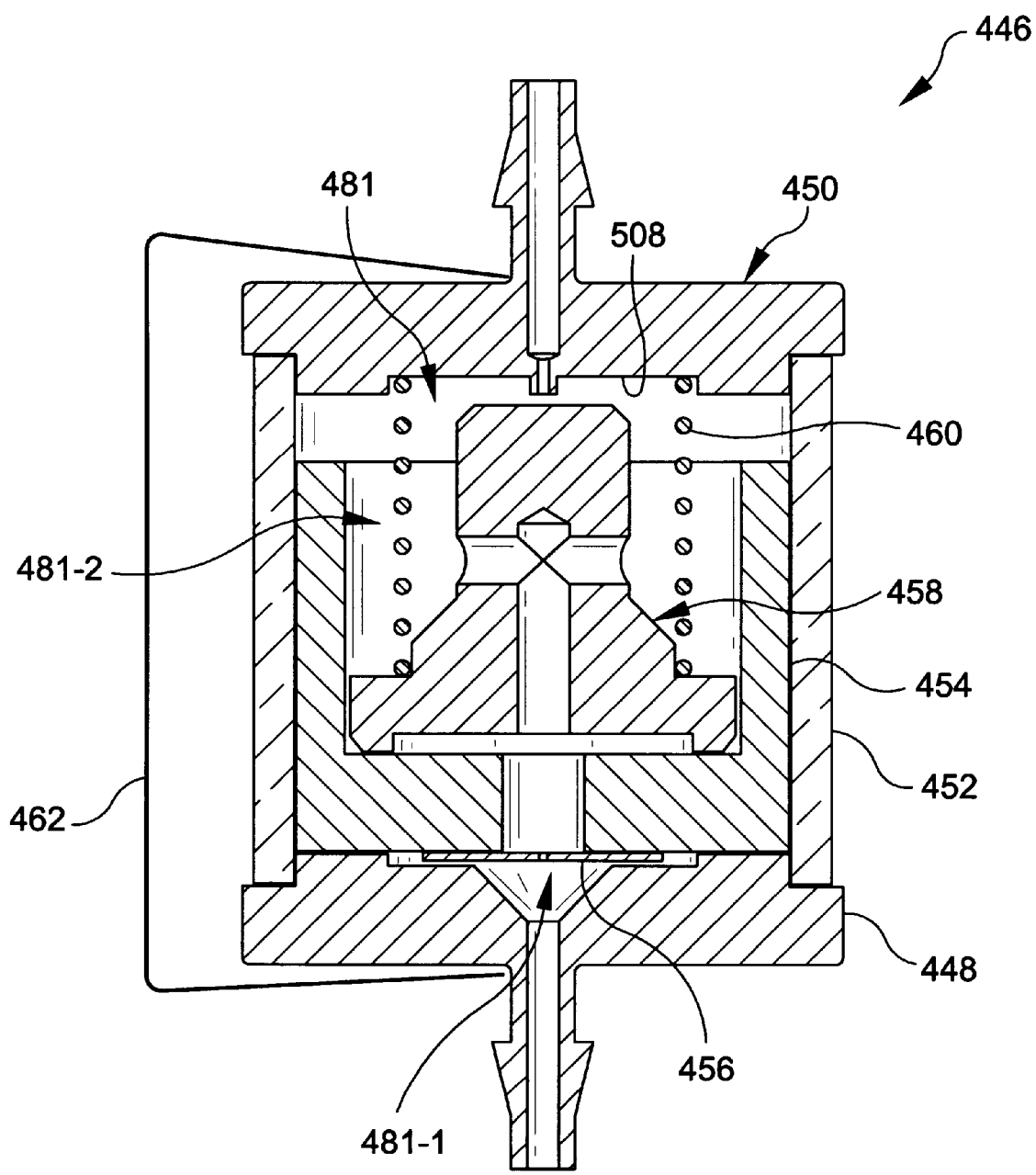
FIG. 28 is a cross-sectional view of the flow regulator shown in FIG. 26.

A further embodiment of a flow regulator according to the present invention is shown in FIGS. 26–32. Flow regulator 446 is similar to flow regulator 246 and 342 described above in that it includes an inlet fitting 448, an outlet fitting 450, a glass cylinder 452, a piston 454, an orifice member 456, a control seat 458 and a spring 460. However, unlike the embodiments described above, this embodiment does not include any O-rings. Rather, the inlet and outlet fittings 448 and 450 are secured in leak-free manner to the glass cylinder 452 by adhesive or any other suitable bonding technique. As shown in FIG. 28, for example, a clip member 462, which is made of a resiliently deflectable material such as metal, aluminum, stainless steel or the like, can be coupled to the inlet and outlet fittings 448 and 450, respectively, to provide for ease of mounting of flow regulator 446 to, for example, a panel in a flow cytometer (e.g., see FIG. 4).

Because the piston 454, control seat 458 and spring 460 are substantially identical to the piston, control seat and spring of the flow regulators 246 and 342, these components will not be discussed in detail. As shown in FIG. 27, the piston 454 includes a bottom portion 464 having an opening 466 therein, and a cylindrical wall 468 which together with the bottom portion 464 forms a cavity 470 in the piston. The control seat 458 includes a base portion 472, a stepped surface 473 which is contacted by spring 460, a recessed portion 474, a vertical portion 476, a T-shaped opening 478, and a top surface 480 which are essentially identical to the corresponding portions of the control seats 266 and 354. The glass cylinder 452 is essentially identical to glass cylinders 252 and 348, but has a length less than those glass cylinders due to the different configurations of inlet and outlet fittings 448 and 450.

When the flow regulator is assembled, piston 454, control seat 458 and spring 460 are contained in a chamber 481 of flow regulator. The orifice member 456 separates an upstream portion 481-1 of chamber 481 from a downstream portion 481-2 of chamber 481.

Figure 29:
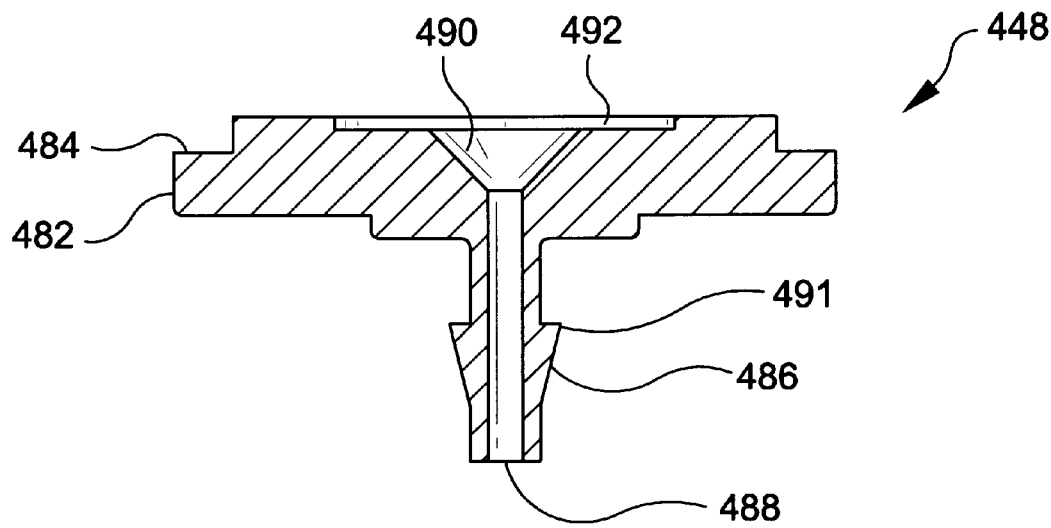
FIG. 29 is a detailed cross-sectional view of the input fitting of the flow regulator shown in FIG. 26.
Figure 30:
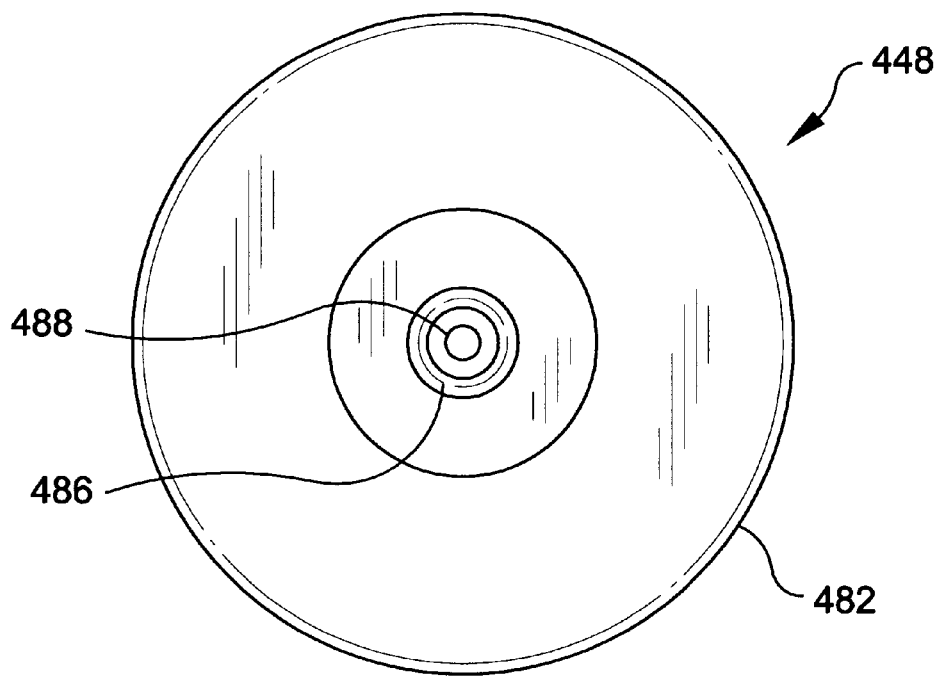
FIG. 30 is a detailed top view of the input fitting of the flow regulator shown in FIG. 26.

Inlet fitting 448 is shown in more detail in FIGS. 29 and 30. Similar to inlet fitting 248, inlet fitting 448 includes a large diameter portion 482 having a ledge portion 484 against which abuts an edge of the glass cylinder 452 when the inlet fitting 448 is coupled to the glass cylinder 452. The inlet fitting 448 further includes an inlet port 486 having an inlet opening 488 therein which communicates with a conical shaped bore 490 in the inlet fitting 448, and a 491 which functions to couple a fluid conduit to the input port 486. However, unlike inlet fitting 248, inlet fitting 448 does not need recess portions for accommodating O-rings since no O-rings are used in the flow regulator 446. Furthermore, inlet fitting 448 includes a recessed portion 492 which further allows fluid to flow into the chamber 461 in the flow regulator 446.

Figure 31:
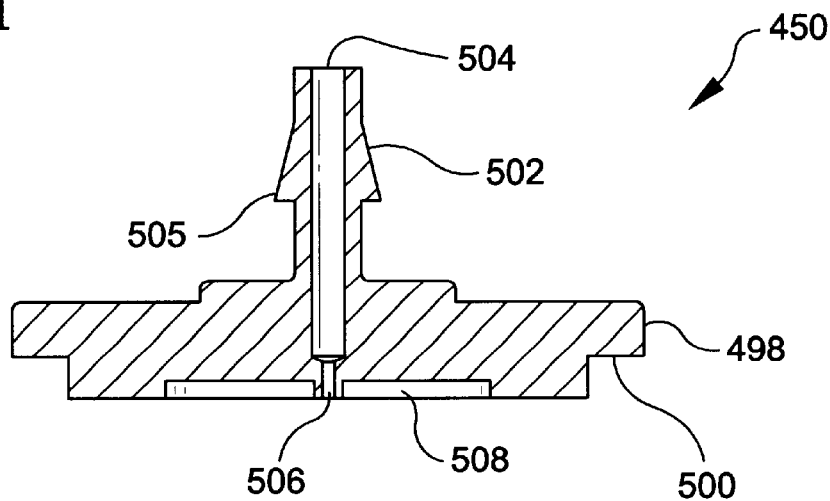
FIG. 31 is a detailed cross-sectional view of the outlet fitting of the flow regulator shown in FIG. 26.
Figure 32:
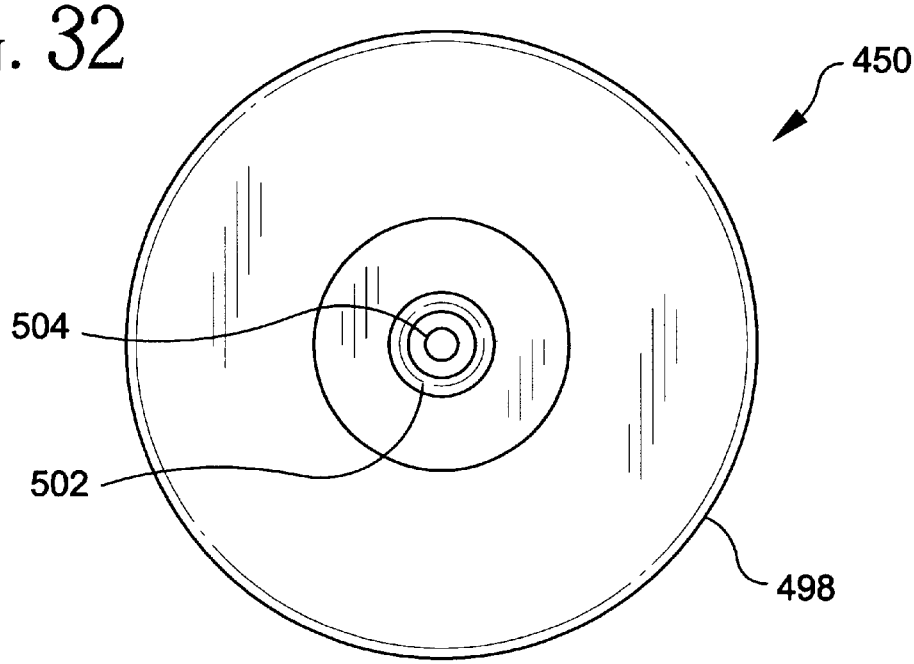
FIG. 32 is a detailed top view of the outlet fitting of the flow regulator shown in FIG. 26.

The outlet port 450 as shown in more detail in FIGS. 31 and 32. Similar to outlet port 250 in flow regulator 246, outlet port 450 includes a large diameter portion 498 having a ledge portion 500 against which abuts an edge of the glass cylinder 452 when the outlet port 450 is coupled to the glass cylinder 452. The outlet fitting 450 further includes an outlet port 502 having an outlet opening 504 therein and a stepped portion 505 which functions to secure a fluid conduit to the outlet port 502. The outlet opening 504 communicates with a control tube 506, which has a diameter smaller than that of outlet opening 504 and whose purpose is the same as control tube 310 in outlet fitting 250 of flow regulator 246. Outlet fitting 450 further includes a recess portion 508 against which abuts an end of the spring 460 when the flow regulator 446 is assembled. However, unlike outlet fitting 250, outlet fitting 450 does not need a recess to accommodate an O-ring since no O-rings are used in the flow regulator 446.

Figure 33:
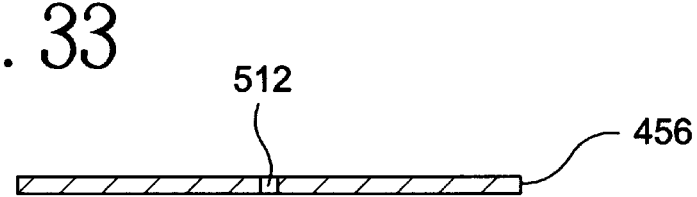
FIG. 33 is a detailed cross-sectional view of the orifice member of the flow regulator shown in FIG. 26.

The orifice member 456 is shown in more detail in FIG. 33. The orifice member 456 is a disk-shaped member having an opening 512 therein through which fluid can pass through opening 466 in the piston 454. It is noted that orifice member 264 or orifice member 352 described above can be used in flow regulator 446 in place of orifice member 456. Likewise, orifice member 456 can be used in flow regulator 246 in place of orifice member 264, and can be used in flow regulator 342 in place of orifice member 352.

As described above, flow regulator 446 operates in a manner essentially identical to flow regulator 246 to maintain a constant volumetric flow rate of fluid which is unaffected by changes in temperature, pressure and viscosity of the fluid. The flow regulator 446 can be used as the flow regulator 128 in the sheath fluid delivery system 100 shown in FIG. 1, and as flow regulators 208, 210 and 212 in the sheath fluid delivery system 155 shown in FIG. 4.

Figure 34:
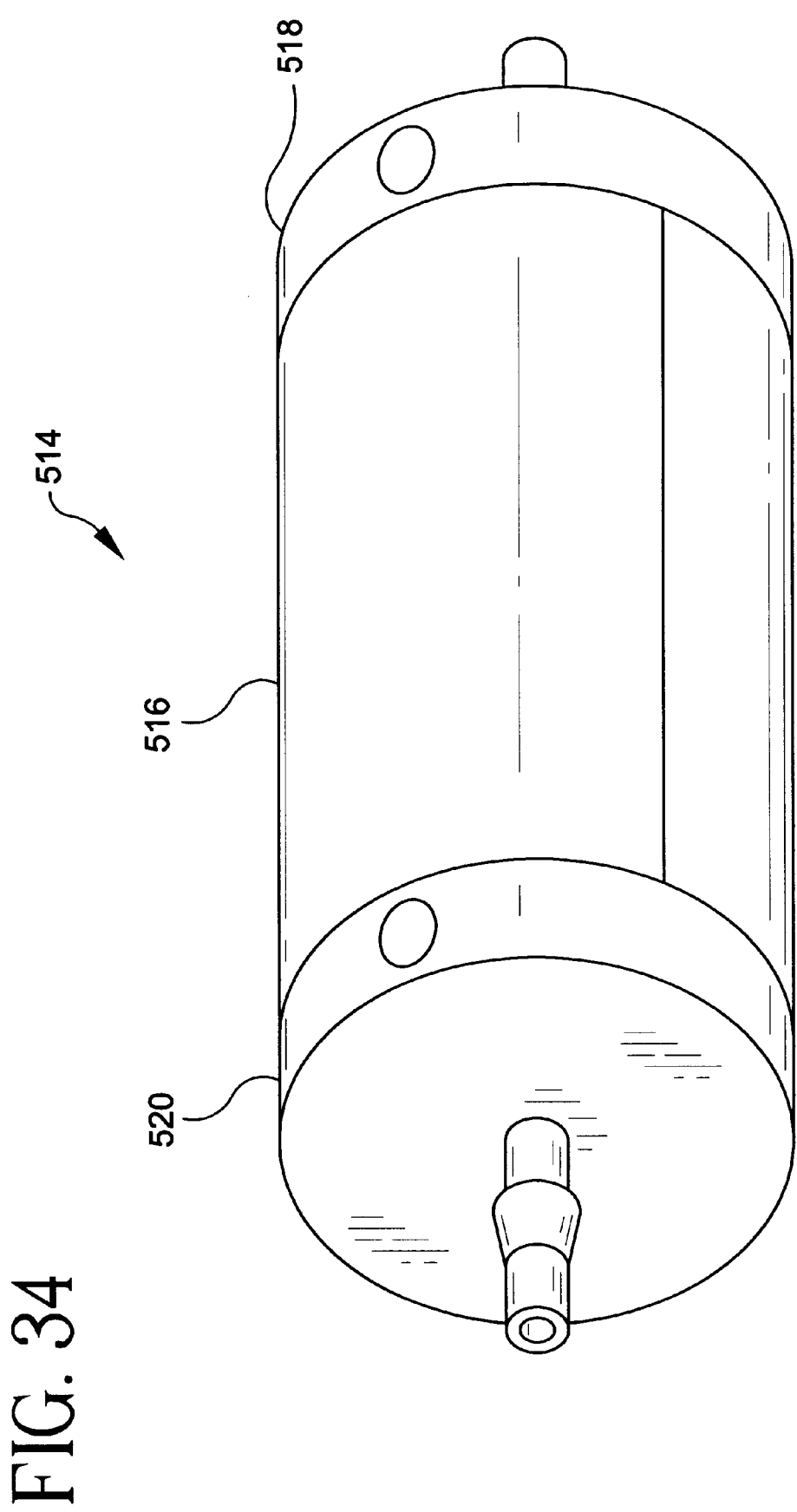
FIG. 34 is a perspective view of a flow regulator according to another embodiment of the present invention.

The above-described embodiments of the flow regulator can further be modified as will now be discussed. In particular, instead of including a spring, the control seat of the flow regulators, as well as the piston, can be made of an electrically permeable material such as 26-1 stainless steel. As shown in FIG. 34, for example, a modified flow regulator 514 of this type would include a solenoid coil 516 that is wrapped around the outside of the glass cylinder (not shown) between inlet fitting 518 and outlet fitting 520.

The solenoid coil 516 can be energized by an DC current which generates an electromagnetic field that imposes a force on the control seat and piston to urge the control seat and piston in a direction toward inlet fitting 518 as does the spring in the embodiments discussed above. If the magnitude of the DC current is increased, the electromagnetic field is proportionally increased and thus, the force exerted on the control seat and piston is also increased. In the embodiments mentioned above which use a spring, in order to change the flow rate at which the flow regulator is to maintain the fluid, a spring having a different spring force can be inserted in the device. However, in this embodiment, the force exerted on the control seat and piston can be increased simply by increasing the current being applied to the solenoid coil 516.

Figure 35:
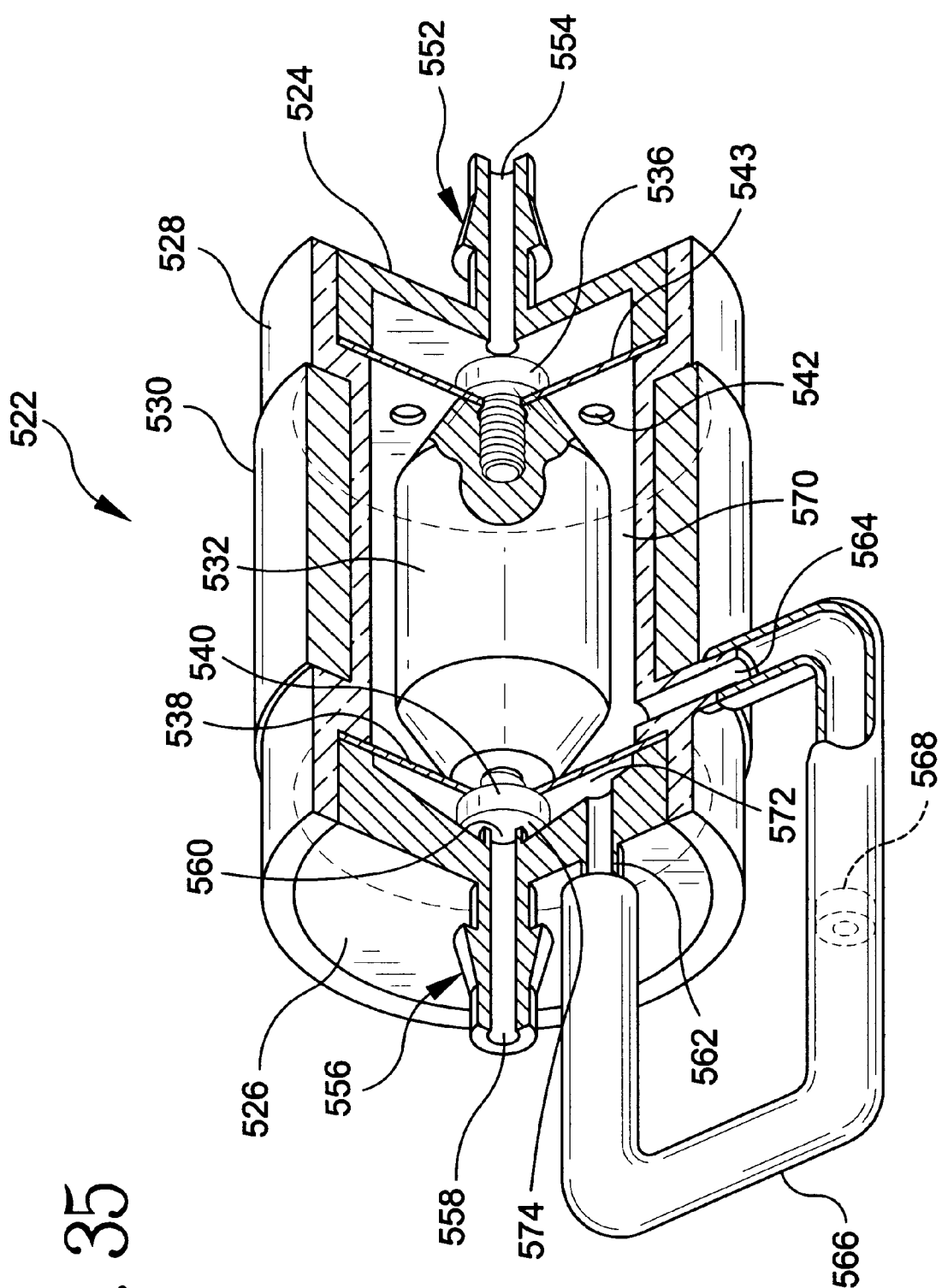
FIG. 35 is a perspective view of a further embodiment of a flow regulator according to the present invention.
Figure 36:
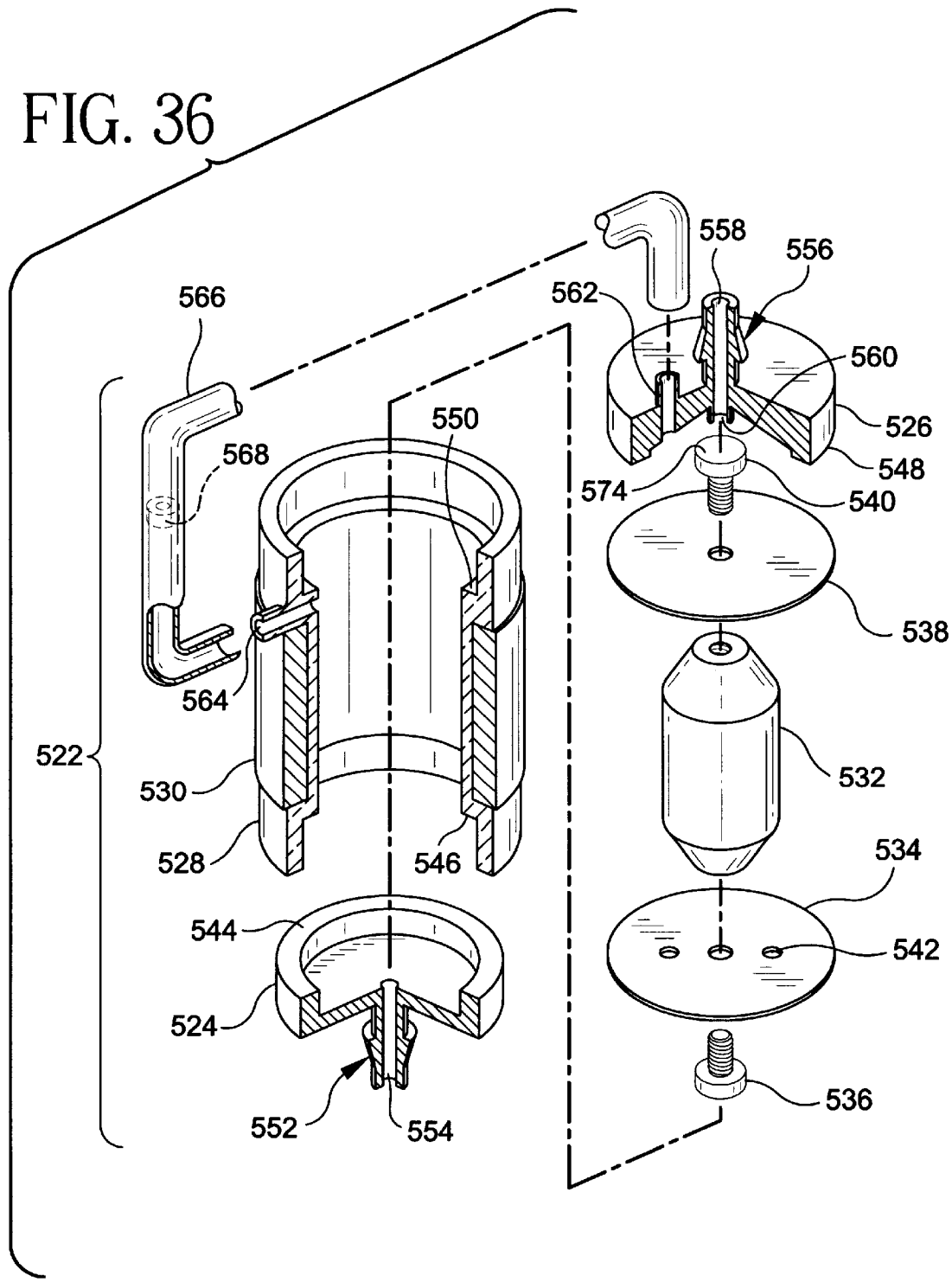
FIG. 36 is an exploded perspective view of the flow regulator shown in FIG. 35.

Another embodiment of the flow regulator according to the present invention is shown in FIGS. 35 and 36. The flow regulator 522 according to this embodiment includes an inlet fitting 524, an outlet fitting 526 and a cylinder 528, which can be made of any suitable material such as steel, 26-1 stainless steel, titanium, various polymers and the like. The cylinder 528 is formed to accommodate a solenoid coil 530 about the circumference of the cylinder 528.

The inlet fitting 524, outlet fitting 526 and cylinder 528 can be made of any suitable materials, such as those described above for the inlet and outlet fittings and glass cylinders of flow regulators 246, 342 and 446.

As illustrated, instead of a control seat and piston arrangement as in the previously mentioned embodiments, flow regulator 522 includes a magnetizable member 532, which is made of an electro-permeable material such as 26-1 stainless steel or any other suitable material. The magnetizable member 532 is coupled at one end to a diaphragm 534 by a fastening member 536 such as a pin, screw or the like, and is coupled at the opposite end to another diaphragm 538 by a control seat/fasting member 540 such as a pin, screw or the like. The diaphragm 534 has openings 542 therein through which fluid can pass, and diaphragm 538 has no opening. When the flow regulator 522 is assembled, the outer edge of the diaphragm 534 is sandwiched between an upper surface 544 of the inlet fitting 524 and a ledge 546 of the cylinder 528, and the outer edge of diaphragm 538 is sandwiched between a lower surface 548 of outlet fitting 526 and a ledge 550 of the cylinder 528. Hence, the diaphragms 534 and 538 support the magnetizable member 532.

Inlet fitting 524 includes an inlet port 552 which is configured similar to the inlet ports of the inlet fittings of the embodiments of the flow regulator described above. In particular, the inlet port 552 includes an opening 554 therein through which fluid can enter the flow regulator 522.

The outlet fitting 526 includes an output port 556 which is similar in construction to the outlet ports of the outlet fittings of the embodiments of the flow regulator described above. In particular, outlet port 556 includes an outlet opening 558 having a control tube 560 therein through which fluid can flow from the flow regulator 522. The control tube 560 is similar in construction to the control tubes in the flow regulators described above. The outlet fitting 526 and the cylinder 528 further includes ports 562 and 564, which are coupled to each other via, for example, a conduit 566 having an orifice member 568 therein which can be similar to any of the orifice members described above.

When the magnetizable member 532 is suspended by diaphragm 534 and 538 so that it does not obstruct opening 554 in the inlet fitting 524 and control tube 560 in the outlet fitting 526, fluid can flow through the flow regulator 522. That is, fluid flows through openings 542 into an inner chamber 570 formed between diaphragms 534 and 538. The fluid in inner chamber 570 flows through port 564, through conduit 566 and orifice member 568 therein, and through port 562 into chamber 572 formed between diaphragm 538 and the inner surface of outlet fitting 526.

Because orifice member 568 restricts the flow of fluid therethrough, a pressure begins to build up in chamber 570. This pressure exerts a force on diaphragm 538, and thus urges diaphragm 538 and the magnetizable member 532 attached thereto toward outlet fitting 526.

However, DC current is applied to the solenoid coil 530 which generates an electromagnetic force that urges the magnetizable member 532 in a direction away from the outlet fitting 526. Hence, the electromagnetic force acts in a manner similar to the force exerted by the spring on the piston in the above embodiments.

That is, in a manner similar to that described above with regard to the flow regulators having the piston and control seat arrangement, an equilibrium condition will be assumed in the flow regulator 522. When this occurs, the top surface 574 of control seat/fastening member 540 will be at a certain distance from the end of control tube 560. The clearance between control tube 560 and the top surface 574 of control seat/fastening member 540 limits the flow of fluid that can pass from chamber 572 into the control tube 560. Accordingly, the flow regulator 522 maintains the flow of fluid at a flow rate that is unaffected or essentially unaffected by changes in fluid pressure, temperature and viscosity as do the flow regulators containing the spring and piston/control seat arrangement described above.

The magnitude of the flow rate set by the flow regulator 522 can be changed in several ways. For example, as discussed above with regard to flow regulator 246, the diameter of the orifice in orifice member 568 can be changed, which would provide a greater rate of flow through the orifice member 568. Also, as can be appreciated from the equilibrium condition equation discussed above, the equilibrium control pressure difference $P_1-P_2$, or $\Delta P$, is dependent on the force F imposed on the magnetizable member 532 and the cross sectional area of the chamber 570. Hence, by changing the cross sectional area of the chamber 570, or by increasing or decreasing the DC current applied to the solenoid coil 530 to thus increase or decrease the magnitude of the electromagnetic force applied to the magnetizable member 532, the equilibrium control pressure difference $P_1-P_2$, or $\Delta P$ is changed. Therefore, in the flow regulator 522, the clearance between the top surface 574 of control seat/fastening member 540 and the control tube 560 self-adjusts with changes in the supply pressure $P_1$ and the downstream pressure $P_3$ to maintain this changed constant equilibrium control pressure difference $P_1-P_2$, or $\Delta P$, across the orifice member 568, which results in a different constant flow rate of the fluid entering the control tube 560 from the chamber 572.

Figure 37:
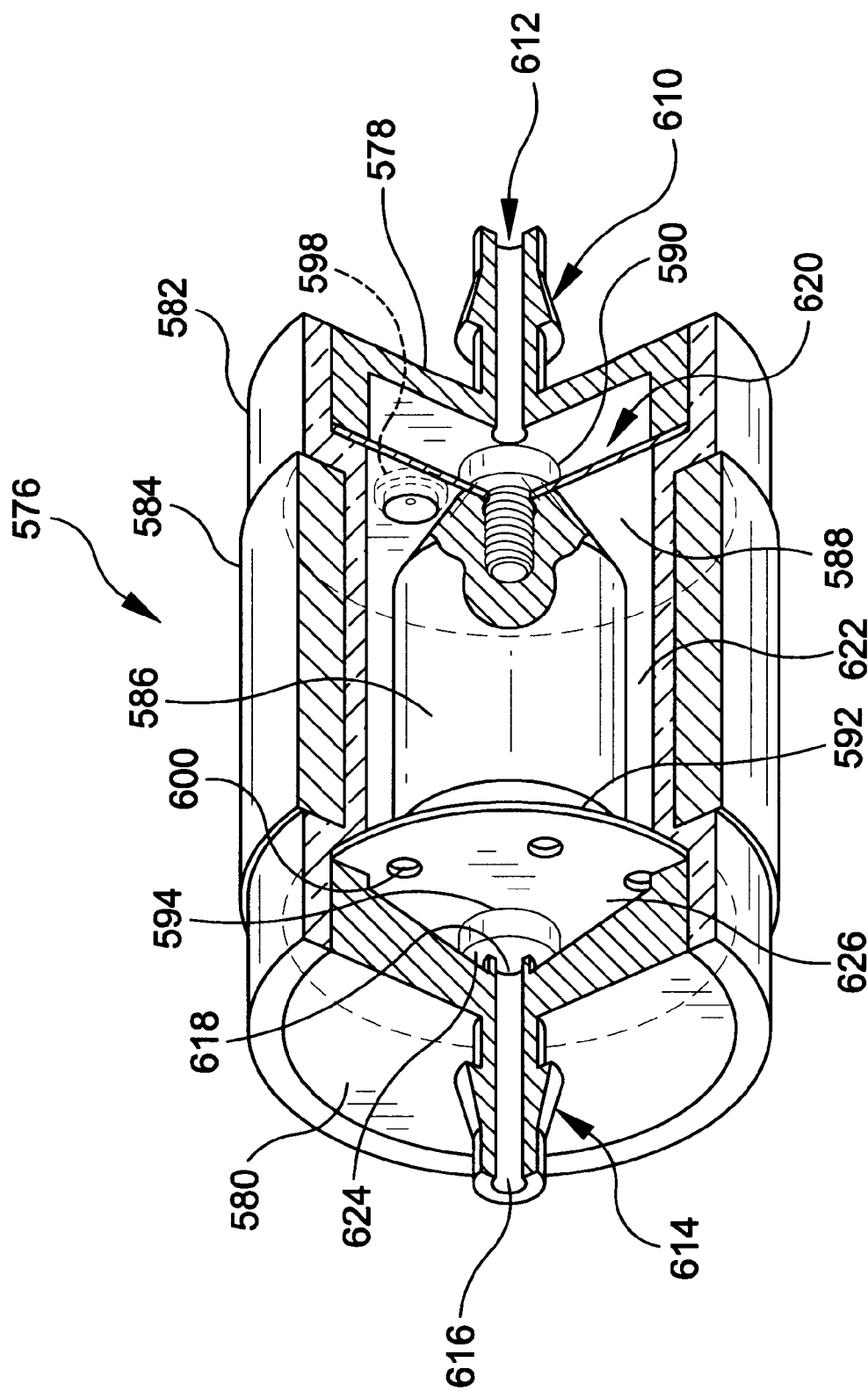
FIG. 37 is a perspective view of another embodiment of a flow regulator according to the present invention.
Figure 38:
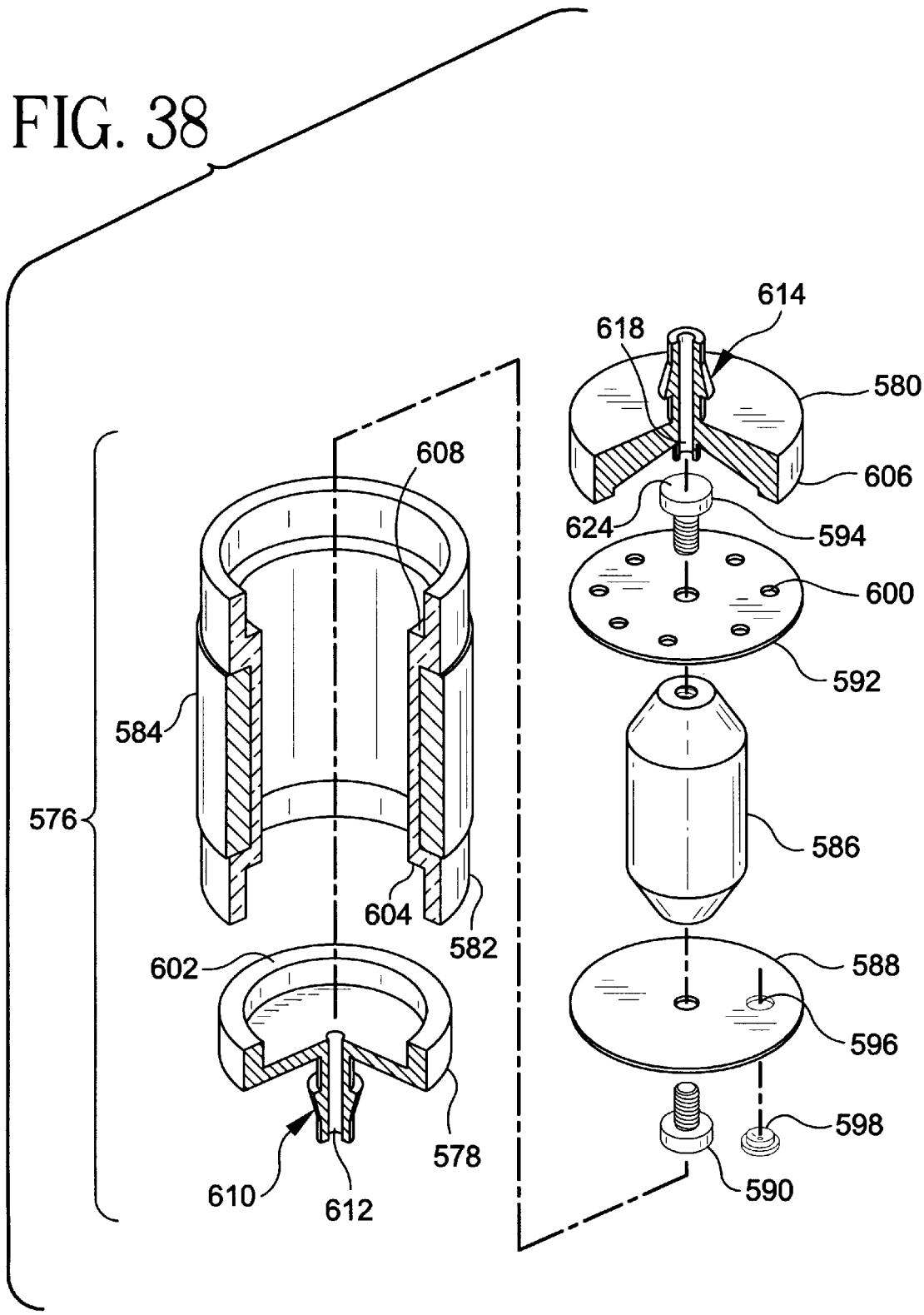
FIG. 38 is an exploded perspective view of the flow regulator shown in FIG. 37.

A flow regulator according to another embodiment of the present invention is shown in FIGS. 37 and 38. In particular, flow regulator 576 includes an inlet fitting 578, an outlet fitting 580, and a cylinder 582. The inlet fitting 578, outlet fitting 580 and cylinder 582 can be made of any suitable materials, such as those described above for the inlet and outlet fittings and cylinder of flow regulators 246, 342 and 446.

Cylinder 582 is formed to accommodate a solenoid coil 584 about its circumference as shown. Flow regulator 576 also includes a magnetizable member 586, which is made of an electro-permeablematerial such as 26-1 stainless steel or any other suitable material, and is similar in construction to magnetizable member 532 described above.

The magnetizable member 586 is coupled at one end to a diaphragm 588 by a fastening member 590 such as a pin, screw or the like, and is coupled at the opposite end to another diaphragm 592 by control seat/fastening member 594 such as a pin, screw or the like. Diaphragm 588 has a single opening 596 therein into which is mounted an orifice member 598, which is similar in construction to the orifice members described above with regard to flow regulators 246, 342, 446 and 522. Diaphragm 592, on the other hand, includes a plurality of openings 600 therein. When the flow regulator 576 is assembled, the outer edge of diaphragm 588 is sandwiched between an upper surface 602 of inlet fitting 578 and a ledge 604 of cylinder 582, and the outer edge of diaphragm 592 is sandwiched between a lower surface 606 of outlet fitting 580 and a ledge 608 of cylinder 582. Hence, diaphragm 588 and 592 support magnetizable member 586.

Inlet fitting 578 includes an inlet port 610 which is configured similar to the inlet ports of the inlet fittings of the embodiments of the flow regulator described above. In particular, inlet port 610 includes an opening 612 therein through which fluid can enter the flow regulator 576.

The outlet fitting 580 includes an outlet port 614 which is similar in construction to the outlet ports of the outlet fittings of the embodiments of the flow regulator described above. In particular, outlet port 614 includes an outlet opening 616 having a control tube 618 therein through which fluid can flow from the flow regulator 576. The control tube 618 is similar in construction to the control tubes in the flow regulators described above.

Although flow regulator 576 is in many ways similar or identical to flow regulator 522, flow regulator 576 in this example does not include any additional ports other than inlet port 610 and outlet port 614. When the magnetizable member 586 is suspended by the diaphragms 588 and 592 so that it does not obstruct opening 612 in the inlet fitting 578 and control tube 616 in the outlet fitting 580, fluid can flow through the flow regulator 576.

That is, fluid enters inlet opening 612 and flows into a chamber 620 formed between diaphragm 588 and the inner surface of inlet fitting 578. The fluid in chamber 620 flows through orifice member 598 into a second chamber 622 defined between diaphragms 588 and 592, and can pass through openings 600 in diaphragm 592.

However, because the orifice member 598 restricts the flow of fluid therethrough, a pressure builds up in chamber 620, which imposes a force on diaphragm 588 that urges diaphragm 588 and the magnetizable member 586 attached thereto toward outlet fitting 580.

However, a DC current is applied to solenoid coil 584 which generates an electromagnetic force that urges the magnetizable member 586 in a direction away from the outlet fitting 580. Hence, the electromagnetic force acts in a manner similar to the force exerted by the spring on the piston in the above embodiments.

In a manner similar to that described above with regard to the flow regulators having the piston and control seat arrangement, an equilibrium condition will be assumed in the flow regulator 576. When this occurs, the top surface 624 of control seat/fastening member 594 will be at a certain distance from the end of control tube 618. Clearance between the control tube 618 and the top surface 624 of control seat/fastening member 594 limits the flow of fluid that can pass from chamber 626, which is formed between diaphragm 592 and the inner surface of outlet fitting 580, into control tube 618. Accordingly, the flow regulator 576 maintains the flow of fluid at a flow rate that is unaffected or essentially unaffected by changes in fluid pressure, temperature and viscosity as do the flow regulators containing the spring and piston/control seat arrangement described above.

The magnitude of the flow rate set by the flow regulator 576 can be changed in several ways. For example, as discussed above with regard to flow regulator 246, the diameter of the orifice in orifice member 598 can be changed, which would provide a greater rate of flow through the orifice member 598. Also, as can be appreciated from the equilibrium condition equation discussed above, the equilibrium control pressure difference $P_1-P_2$, or $\Delta P$, is dependent on the force F imposed on the magnetizable member 586 and the cross sectional area of the chamber 620. Hence, by changing the cross sectional area of the chamber 620, or by increasing or decreasing the DC current applied to the solenoid coil 584 to thus increase or decrease the magnitude of the electromagnetic force applied to the magnetizable member 586, the equilibrium control pressure difference $P_1-P_2$, or $\Delta P$ is changed. Therefore, in the flow regulator 576, the clearance between the top surface 624 of control seat/fastening member 594 and the control tube 618 self-adjusts with changes in the supply pressure $P_1$ and the downstream pressure $P_3$ to maintain this changed constant equilibrium control pressure difference $P_1-P_2$, or $\Delta P$, across the orifice 598, which results in a different constant flow rate of the fluid entering the control tube 618 from the chamber 626.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A flow regulator comprising:

a housing defining a chamber therein, and comprising inlet and outlet ports in communication with the chamber and being adapted to direct fluid into and out of the chamber, respectively;

a piston assembly, movably disposed in the chamber, and being movable in a forward direction toward the outlet port and in a reverse direction away from the outlet port, the piston comprising a surface portion and an opening defining portion having an opening therein; and an urging device which provides an urging force to urge the piston assembly in the reverse direction away from the outlet port;

the opening in the piston assembly and the urging device being configured such that when the fluid flows into the chamber through the inlet port, an equilibrium condition results in which a clearance between the surface portion of the piston assembly and the outlet port self-adjusts such that the fluid flows through the flow regulator at a flow rate relatively unaffected by a change in supply pressure, downstream pressure, and temperature of the fluid;

the piston assembly including a cavity and a control seat and the piston assembly being slidably disposed in the chamber to be urged by the urging device away from the outlet port, the control seat comprising the surface portion.

2. A flow regulator as claimed in claim 1, further comprising:

an orifice defining portion, which is disposed at the opening in the opening defining portion of the piston assembly and defines an orifice therein which divides the chamber into an upstream portion and a downstream portion such that the fluid flows from the upstream portion through the orifice undeveloped into the cavity of the piston.

3. A flow regulator as claimed in claim 1, wherein:

the housing comprises inlet and outlet fittings which define the inlet and outlet ports respectively therein; and wherein at least one of the inlet and outlet fittings define an auxiliary port therein which is adapted to couple to a conduit system to provide communication between the chamber of the housing and the conduit.

4. A flow regulator as claimed in claim 1, further comprising:

a conduit system; and wherein the inlet and outlet fittings each define a respective said auxiliary port therein, and the conduit system provides communication between the auxiliary ports to provide communication through the conduit system between an upstream portion of the chamber which is upstream of the opening in the piston assembly and a downstream portion of the chamber which is downstream of the opening in the piston assembly.

5. A flow regulator as claimed in claim 4, wherein:

the conduit system includes at least one conduit having an orifice member therein which restricts flow of the fluid through the conduit.

6. A flow regulator as claimed in claim 5, wherein:

the conduit system includes a plurality of said conduits coupled in parallel between the auxiliary ports in the inlet and outlet fittings.

7. A flow regulator as claimed in claim 5, wherein:

the at least one conduit further includes a valve therein which is manipulated to permit or prevent passage of the fluid therethrough.

8. A flow regulator as claimed in claim 4, wherein:

the conduit system includes at least one conduit having a valve therein which is manipulated to permit or prevent passage of the fluid therethrough.

9. A flow regulator as claimed in claim 4, further comprising:

a plug inserted in the opening defining portion of the piston assembly to block flow of fluid through the opening.

10. A flow regulator as claimed in claim 1, wherein:

the urging device comprises a spring disposed between the piston assembly and a portion of the housing defining the outlet port.

11. A flow regulator as claimed in claim 1, wherein:

the urging device comprises a magnetic field generating device which is adaptable to exert a magnetic force on the piston assembly to urge the piston assembly in a direction away from the outlet port.

12. A flow regulator as claimed in claim 1, wherein:

the inlet port is configured to couple to a sheath fluid conduit of flow cytometer, such that the fluid being directed by the inlet port into the chamber is sheath fluid; and the outlet port is configured to couple to a flow cell conduit of the flow cytometer, such that the outlet port directs the fluid out of the chamber to the flow cell conduit.

13. A flow regulator as claimed in claim 1, wherein:

the opening defining portion is a membrane having the opening therein, the membrane movably coupling the piston assembly to the housing.

14. An apparatus for regulating a rate of flow of fluid therethrough, comprising:

an inlet port, adapted to receive the fluid therein;

an outlet port, adapted to output fluid therefrom;

an orifice defining member, disposed between the inlet and outlet ports and defining an orifice therein, and being configured such that a relatively fixed difference between a pressure of the fluid upstream of the orifice member and a pressure of the fluid downstream of the orifice member is maintained to maintain a rate of flow of fluid through the apparatus which is relatively unaffected by a change in supply pressure, downstream pressure and temperature of the fluid;

control seat having a control surface; and a control tube, disposed in the outlet port, and having an end for receiving the fluid therein;

a clearance between the control surface of the control seat and the end of the control tube automatically adjusting such that the fluid flows through the apparatus at the flow rate which is relatively unaffected by a change in supply pressure, downstream pressure, and temperature of the fluid.

* * * * *